United States Patent
Jaffe et al.

(10) Patent No.: US 9,381,606 B2
(45) Date of Patent: Jul. 5, 2016

(54) DEVICE AND METHOD FOR ROTATIONAL SPEED INCREASING FOR MACHINING PROCESS

(75) Inventors: Teddy Jaffe, Kfar Vradim (IL); Tzvika Miller, Kiryat Tivon (IL)

(73) Assignee: GAL WAY LTD., Afula (IL)

( * ) Notice: Subject to any disclaimer, the term of this patent is extended or adjusted under 35 U.S.C. 154(b) by 1159 days.

(21) Appl. No.: 13/363,462

(22) Filed: Feb. 1, 2012

(65) Prior Publication Data
US 2013/0195576 A1    Aug. 1, 2013

(51) Int. Cl.
  *B23Q 5/04*    (2006.01)
  *B23Q 11/10*   (2006.01)
  *B23Q 5/06*    (2006.01)

(52) U.S. Cl.
  CPC ........ *B23Q 5/048* (2013.01); *B23Q 5/06* (2013.01); *B23Q 11/1023* (2013.01); *Y10T 409/30448* (2015.01); *Y10T 409/304032* (2015.01); *Y10T 409/309296* (2015.01); *Y10T 409/309352* (2015.01)

(58) Field of Classification Search
  CPC ...... B23Q 5/048; B23Q 5/06; B23Q 11/1023; B23C 2270/025; B23C 2270/027; F01D 15/06; F01D 15/065; Y10T 409/30448; Y10T 409/309296; Y10T 409/309352; Y10T 409/309408
  USPC ......... 409/135, 136, 137, 144, 230, 231, 232; 433/132; 415/202, 905
  See application file for complete search history.

(56) References Cited

U.S. PATENT DOCUMENTS

| | | | | |
|---|---|---|---|---|
| 3,119,210 A | * | 1/1964 | Doeden | 409/231 |
| 3,132,426 A | * | 5/1964 | White | 433/132 |
| 3,210,848 A | * | 10/1965 | Bizzigotti | 433/132 |
| 4,705,439 A | * | 11/1987 | Hoyle et al. | 409/136 |
| 5,423,678 A | * | 6/1995 | Nakanishi | 433/115 |
| 5,674,032 A | * | 10/1997 | Slocum et al. | 409/131 |
| 5,941,664 A | * | 8/1999 | Morsch | 409/131 |
| 5,947,485 A | * | 9/1999 | Nguyen | 279/46.2 |

(Continued)

FOREIGN PATENT DOCUMENTS

| | | | | |
|---|---|---|---|---|
| JP | 2002 1 26963 | | 5/2002 | |
| JP | 2007190636 A | * | 8/2007 | |
| WO | WO 2011-001421 | | 1/2011 | |

OTHER PUBLICATIONS

European Search Report of Application No. 13153210.3 mailed on Apr. 8, 2013.

*Primary Examiner* — Erica E Cadugan
*Assistant Examiner* — Michael Vitale
(74) *Attorney, Agent, or Firm* — Pearl Cohen Zedek Latzer Baratz LLP

(57) ABSTRACT

A spindle assembly configured to be assembled at the internal taper socket of a tool holder, the assembly including: a rotating shaft configured for rotation within the tool holder; a bearing assembly, comprising a front end bearing assembly and rear end bearing assembly, configured to radially and axially support the rotating shaft within the tool holder and to enable high-speed rotation of the shaft within the tool holder; a turbine operatively connected with the rotating shaft, the turbine configured to rotate the rotating shaft; a plurality of passages configured to allow high pressure coolant fluid flowing from the tool holder to drive the turbine, wherein at least one bearing of the bearing assembly is disposed in a part of the spindle assembly which is configured to be situated in the space defined by the taper socket of the tool holder and a front clamping nut.

9 Claims, 27 Drawing Sheets

(56) References Cited

U.S. PATENT DOCUMENTS

| | | | |
|---|---|---|---|
| 2001/0014281 A1* | 8/2001 | Uesugi et al. | 415/111 |
| 2004/0018467 A1* | 1/2004 | Tanaka et al. | 433/132 |
| 2004/0146368 A1 | 7/2004 | Konishi | |
| 2009/0252594 A1* | 10/2009 | Itoh et al. | 415/110 |

* cited by examiner

DEVICE AND METHOD FOR ROTATIONAL SPEED INCREASING FOR MACHINING PROCESS

BACKGROUND OF THE INVENTION

Spindles provide for increased production, and improved overall efficiency of machining devices such as lathes, milling machines, drilling machines, etc. However, known spindles may be very complex and often constructed from very expensive components such as advanced bearing assemblies and motors. Hence, spindles tend to be very expensive, which limit their usage to only very high production quantities and high cutting qualities.

An alternative solution is spindle speeders (also referred to as spindle speed increasers or multipliers). These devices may be assembled on the machining device and rotate together with the main spindle of the machining device. Thus, the overall rotation speed of the assembly may be the algebraic sum of the rotation speed of the spindle speeders and the rotation speed of the main spindle of the machining device.

Furthermore, many spindle speeders require an external power supply to the machining device such as air pressure, water pressure or electricity. Normally, these external power supplies are not available at old and low cost machining devices. Thus, the utilization of many of spindle speeders by these machining devices is impractical. This fact extremely reduces the market size for these solutions.

However, many machining devices, including these found at workshops of all sizes, include systems for delivering pressurized coolant fluid through the main spindle.

SUMMARY OF THE INVENTION

According to embodiments of the present invention there is provided a spindle assembly configured to be assembled at the internal taper socket of a tool holder, the assembly having a rear end and a front end, the front end being proximal to a tool clamping system of the assembly, and the rear end being proximal to an end of the assembly opposite to the tool clamping system. The assembly may include: a rotating shaft configured for rotation within the tool holder; a bearing assembly, including a front end bearing assembly and rear end bearing assembly, configured to radially and axially support the rotating shaft within the tool holder and to enable high-speed rotation of the shaft within the tool holder; a turbine operatively connected with the rotating shaft, the turbine configured to rotate the rotating shaft; a plurality of passages configured to allow high pressure coolant fluid flowing from the tool holder to drive the turbine, wherein at least one bearing of the bearing assembly is disposed in a part of the spindle assembly which is configured to be situated in the space defined by the taper socket of the tool holder and a front clamping nut.

Furthermore, according to embodiments of the present invention, the spindle assembly may include a hollow housing to mechanically support the components of the spindle assembly.

Furthermore, according to embodiments of the present invention, the hollow housing may include a collet.

Furthermore, according to embodiments of the present invention, the passages may be at least partially defined by the outer surface of the housing and the inner surface of the taper socket of the tool holder.

Furthermore, according to embodiments of the present invention, the plurality of passages may be configured to allow at least some of the coolant fluid to flow through the bearing assembly, to cool and lubricate the bearings.

Furthermore, according to embodiments of the present invention, the plurality of passages may include a coolant exhaust.

Furthermore, according to embodiments of the present invention, the coolant exhaust may allow the coolant fluid to flow towards a working point of a tool mounted on the spindle assembly.

Furthermore, according to embodiments of the present invention, the coolant exhaust may include means located at a front end of the spindle assembly and selected from the group including: openings, jets and sprinklers.

Furthermore, according to embodiments of the present invention, the plurality of passages may include a hollow tunnel through the rotating shaft, the hollow tunnel configured to allow some of the coolant to flow, at high pressure and low flow rate, towards a central bore of a tool mounted on the spindle assembly.

Furthermore, according to embodiments of the present invention, the rear end of the spindle assembly may include a dynamic sealing system to substantially prevent leakage of coolant fluid flowing through the hollow tunnel of the rotating shaft.

Furthermore, according to embodiments of the present invention, the dynamic sealing system may allow leakage of coolant fluid through the dynamic sealing system, and the plurality of passages may include passages configured to allow leakage coolant fluid to flow to the rear end bearing assembly and the front end bearing assembly, providing lubrication and cooling to the rear end bearing assembly and the front end bearing assembly.

Furthermore, according to embodiments of the present invention, the front end bearing assembly and rear end bearing assembly may be mounted in a configuration selected from the group including: back to back, face to face and tandem.

Furthermore, according to embodiments of the present invention, each bearing assembly may include at least one bearing.

Furthermore, according to embodiments of the present invention, the turbine may be placed in a location selected from the group including: behind the rear end bearing assembly, between the rear end bearing and the front end bearing assemblies, and in front of the front end bearing assembly.

Furthermore, according to embodiments of the present invention, the bearing assembly may be preloaded with preload pressure applied by a spring.

Furthermore, according to embodiments of the present invention, the front end bearing assembly and the rear end bearing assembly may be positioned adjacent to each other and wherein preloading may be achieved by this positioning.

Furthermore, according to embodiments of the present invention, the turbine may be selected from the group including: an axial impulse turbine, a radial impulse and a reaction turbine.

Furthermore, according to embodiments of the present invention, the coolant may be emulsion of water and oil.

Furthermore, according to embodiments of the present invention, the spindle assembly may include tool clamping system.

Furthermore, according to embodiments of the present invention, the spindle assembly may include a preparation for rotor retention system.

Furthermore, according to embodiments of the present invention, the spindle assembly may include a rotation speed measuring system such as a speed measuring system including a Hall sensor for measuring the rotation speed of the shaft.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
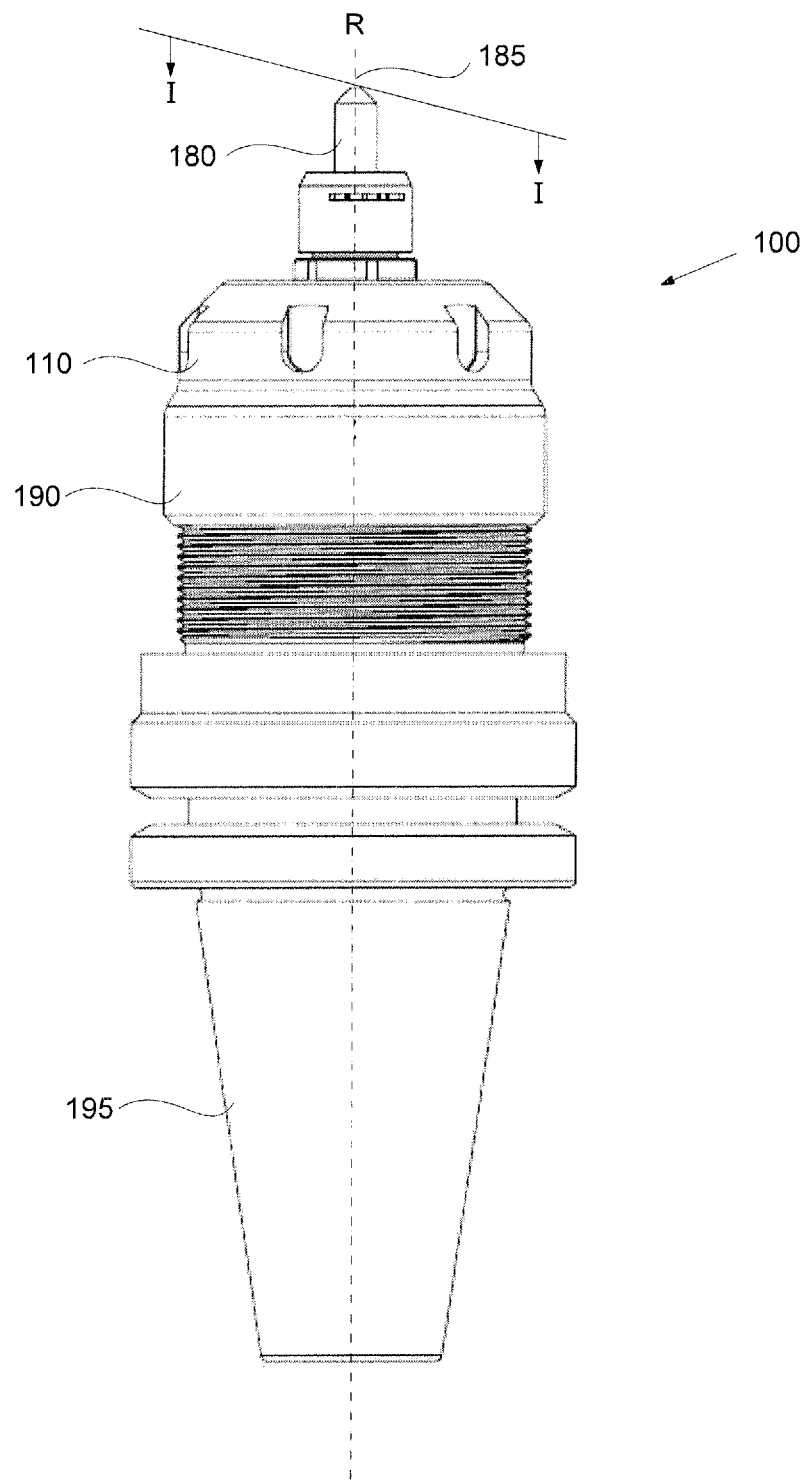
FIG. 1A is a diagram of an exemplary spindle system, according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS
OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the present invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

According to embodiments of the present invention, a spindle assembly may be configured to be assembled at an internal taper socket of a tool holder of a machining device. The spindle assembly may be divided to a first part and a second part along the longitudinal dimension of the spindle assembly. The spindle assembly is designed so that when the spindle assembly is mounted on a tool holder, the first part of the spindle assembly may be disposed or situated in a space defined by the taper socket of the tool holder and the front clamping nut. For example, at least half of the longitudinal dimension of the spindle assembly according to embodiments of the present invention may be disposed or situated in a space defined by the taper socket of the tool holder and the front clamping nut when the spindle assembly is mounted on a tool holder. According to embodiments of the present invention, the first part of the spindle assembly includes at least the rear end bearing assembly of the spindle.

Throughout the present application, the term "main spindle" may refer to a spindle integral to the machining device. The main components of a spindle assembly according to embodiments of the invention may be a support structure, a rotating shaft configured for rotation within the tool holder about a rotation axis R, a bearing assembly configured to radially and axially support the rotating shaft within the tool holder and to enable high-speed rotation of the shaft, and a turbine operatively connected with the rotating shaft. The turbine may be configured to rotate the rotating shaft in response to a flow of fluid, such as high pressure coolant fluid supplied by the machining device through the tool holder. The spindle assembly may further comprise a plurality of passages configured to allow high pressure coolant fluid flowing from the tool holder through the spindle assembly to drive the turbine. At least one bearing, for example, the rear end bearing assembly, of the spindle is situated, or disposed, in the cone shaped cavity being the space defined by the socket of the tool holder and the front clamping nut. The socket of the tool holder may be tapered having a cone shape.

Spindles according to embodiments of the present invention may reach rotation speed of, for example, 40 Krpm with moment of 0.2 Nm. However, spindles according to embodiments of the present invention may reach higher or lower rotation speeds, and other magnitudes of moments. It should be noted that when working with spindle according to some embodiments of the present invention, the main spindle of the machining device typically does not rotate. This may eliminate superposition of tolerance errors, due to cumulative effects of tolerances in the tool holder and in the spindle, and improve the overall accuracy of the spindle performance. Embodiments of the invention, however, are not limited in this regard; hence, according to some embodiments, the main spindle of the machining device may rotate together with the spindle thus reaching high working speed which is the algebraic sum of the particular rotation speeds of the main spindle and a spindle according to embodiments of the invention.

Rotation axis R may be a longitudinal axis, central to the spindle and to the tool holder. Terms used throughout the present application to describe location of elements in spindles according to embodiments of the present invention, are made relative to a tool clamping system of the spindle according to embodiments of the present invention, along rotation axis R. A forward or front direction refers to the direction of the tool clamping system or may have a meaning of proximal to that tool clamping system. Similarly an opposite rear direction refers to the reverse direction, the end of the spindle opposite to the tool clamping system, or may have a meaning of proximal to the end opposite to the tool clamping system. Similarly, the term "before" may relate to an element placed closer to the tool clamping system along rotation axis R with relation to another element, and the term "behind" may relate to an element placed further away from the tool clamping system along rotation axis R with relation to another element.

According to embodiments of the present invention, the tool holder may be a standard tool holder such as BT40 or HSK40 or a propriety tool holder. A rear taper end of the tool holder may enable secured mounting on a machining device (not shown), such as a lathe milling machine, drilling machine, etc. The internal taper socket of a tool holder may conform and obey to any known relevant standard relating to attachment of a spindle to a rotating tool holder. For example, the internal taper socket of a tool holder may conform to ER40 or to ER32, TG100, SC, R8, MT2 collets standards.

As used herein, support structure refers to elements used to provide mechanical support to the various components of spindle, according to embodiments of the present invention. The support structure may include propriety or standard housing, such as an ER40-ER16 collet. Alternatively, in some embodiments of the present invention the internal taper of the tool holder may provide housing to the spindle, while the support structure may include elements for holding the bearings in place.

According to embodiments of the present invention, the turbine of the spindle may be operatively connected with the rotating shaft. The turbine may be mounted on the rotating shaft using any suitable technique such as screwing, gluing etc. Alternatively, the turbine and the shaft may be provided as one piece. The turbine may be an impulse turbine, a reaction turbine, or any combination thereof. The turbine may be located at a front end of the shaft, between the front end bearing and the clamping system, at a middle part of the shaft, between the front end bearing and the rear end bearing, and at a rear end of the shaft, behind the rear end bearing.

According to embodiments of the present invention, the bearing assembly may include a front end bearing assembly and a rear end bearing assembly. Each of the front end bearing assembly and a rear end bearing assembly may include one or more bearings. The bearing assembly may include any type of bearing that supports both radial and axial loads. The tolerance of the bearing assembly may range from low precision, such as ABEC 1 class of the ABEC scale or normal class 6X of the ISO 492 standard, up to high precision, such as ABEC 9P class of the ABEC scale or normal class 2 of the ISO 492 standard. For example, the bearing assembly may include ball bearing such as deep groove ball bearing, angular contact ball bearing, four point contact ball bearing or magneto bearings. Bearings with snap ring groove, contact sealed type, non contact sealed type, shielded type or open type bearing, may be used, based on specific design requirements. The front end bearing assembly and the rear end bearing assembly may be mounted in back to back (BTB), face to face (FTF) or tandem configurations.

Bearing preload may be achieved by any suitable preload technique. Preload is intended to eliminate clearances in both axial and radial direction by applying load to push the bearing such that the bearing is secured to the bearing rail. For example, the front end bearing and rear end bearing may be preloaded using constant pressure technique. For example, bearing preload may be achieved using a spring that applies consistent (constant) pressure to front end bearing assembly and rear end bearing assembly against a rigid stopper element such as a preload screw, a screw-nut, the turbine etc. Any type of suitable spring, such as O-rings, coil springs, Belleville springs, wave springs and/or finger springs may be used for preloading front end bearing assembly and rear end bearing assembly. Depending on the configuration of front end bearing assembly and a rear end bearing assembly, preload may be applied on either the inner or the outer rails of front end bearing assembly and a rear end bearing assembly. Alternatively, positioning preloading may be used as well. Positioning preload may be achieved by mechanically locking the front end bearing end rear end bearing in position while under axial load.

According to embodiments of the present invention, at least some of the plurality of passages configured to allow high pressure coolant fluid flowing from the tool holder to drive the turbine may be at least partially defined by the outer surface of the support structure and the inner surface of the taper socket of the tool holder. Additionally or alternatively, the passages may be internal to the spindle. For example, the passages may include tunnels defined by the support structure, the central passage provided by the hollow tunnel at the center of the shaft, passages found between balls of the bearings, etc.

According to embodiments of the present invention, a rotating shaft of the spindle may include a hollow tunnel at the center providing a passage configured to allow high pressure coolant fluid flowing from tool holder to flow, at high pressure and low flow rate towards a central passage that may be disposed along the center of the tool. The rear end of the spindle assembly may include a dynamic sealing system such as labyrinth system intended to prevent, typically with a high but not ultimate efficiency, leakage of coolant fluid flowing through hollow tunnel of the rotating shaft. The dynamic sealing system may allow leakage of coolant fluid through the dynamic sealing system. Passages may be provided, configured to allow the leakage coolant fluid to flow to the rear end bearing assembly and the front end bearing assembly, providing lubrication and cooling to the rear end bearing assembly and the front end bearing assembly.

The coolant fluid may be any fluid supplied by the machining device the tool holder is attached to. Typically, the coolant fluid is an emulsion of about 95% water and 5% oil. The high pressure coolant fluid is typically supplied by the machining device at a pressure of 8-20 Bar, and may reach up to 90 Bar.

According to embodiments of the present invention, passages may be provided to allow coolant exhaust after being used for driving the turbine. For example, coolant exhaust may include openings provided at a front end of the spindle assembly, the openings allowing the coolant to flow away from the spindle. For example, the openings may allow the coolant to flow towards a working point of a tool mounted on the spindle assembly Alternatively, jets or sprinklers may be provided at a front end of the spindle assembly to direct coolant leaving the turbine area and/or the bearing assemblies towards the working point of the tool, thus cooling and removing debris from the working point. Exhaust may be provided by tunnels pointing at an angle towards the working point. The working point of a tool may be the point or area of contact of a tool with a work piece.

Embodiments of the present invention are not limited to a specific tool clamping system, or to a specific tool. Any suitable tool such as any cutting tool, grinding tool honing tool etc. may be mounted on spindle assemblies according to embodiments of the present invention. Additionally, any suitable tool clamping system and technique may be used, such as a clamping collet, Heat Shrink clamping, elastic deformation clamping, hydraulic or Nickel-Titanium (Nitinol)—shape memory alloy (NiTi) clamping, etc. Similarly, embodiments of the present invention are not limited to any specific rotor retention method used for preventing rotation of the spindle shaft while assembling and disassembling tools. For example, preparations for rotor retention such as two flat areas (suitable for a flat key), a plurality of holes, six flat areas, special slots etc, may be included in the spindle. As used herein, rotor may refer to the rotating parts of the spindle, such as the shaft and the parts attached to the shaft.

Embodiments of the present invention may include means for measuring the rotation speed of the shaft. Any suitable rotation speed measurement method and technique may be used. For example, a magnet may be mounted on the rotating shaft and rotation speed measuring system including a Hall Effect sensor may be used for rotation speed measurement.

Embodiments of the present invention will now be demonstrated by way of exemplary designs. It should be noted that the current invention is not limited to the specific examples shown, and that implementations of the principles described herein may vary as may be required to meet specific design requirements. In addition, some of the examples below may present only selected aspects of embodiments of the present invention.

Reference is made to FIG. 1A depicting an illustration of an exemplary spindle system 100 according to embodiments of the present invention. According to embodiments of the present invention, spindle system 100 may include spindle assembly 110, mounted on a tool holder 190, and holding a tool 180. Tool 180 and the rotating shaft (not shown in FIG. 1A) of spindle 110 are adapted to rotate over a common central axis, referred to as rotation axis R.

Figure 1B:
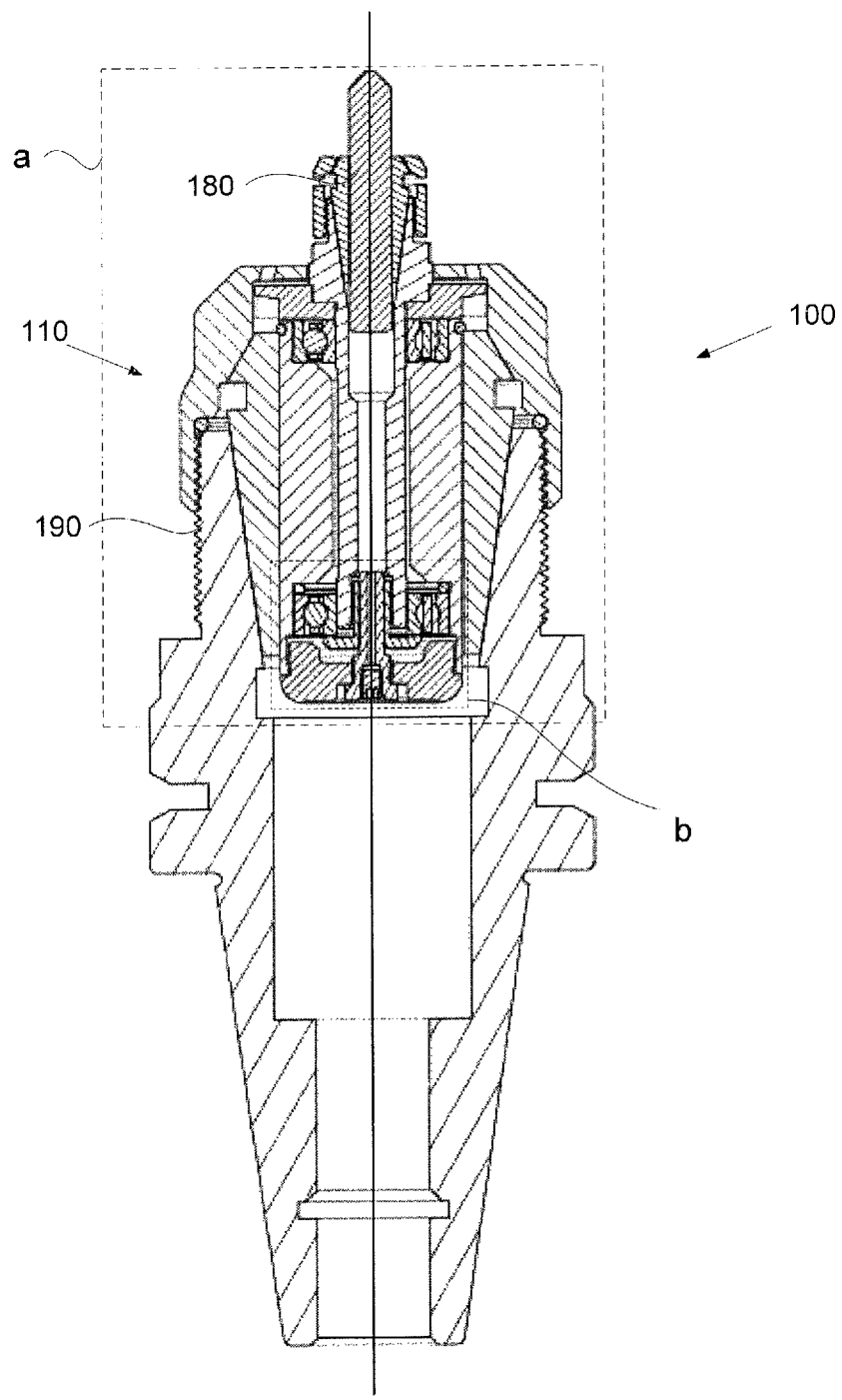
FIG. 1B is a schematic cross section illustration of the exemplary spindle system of FIG. 1A, according to embodiments of the present invention.
Figure 1C:
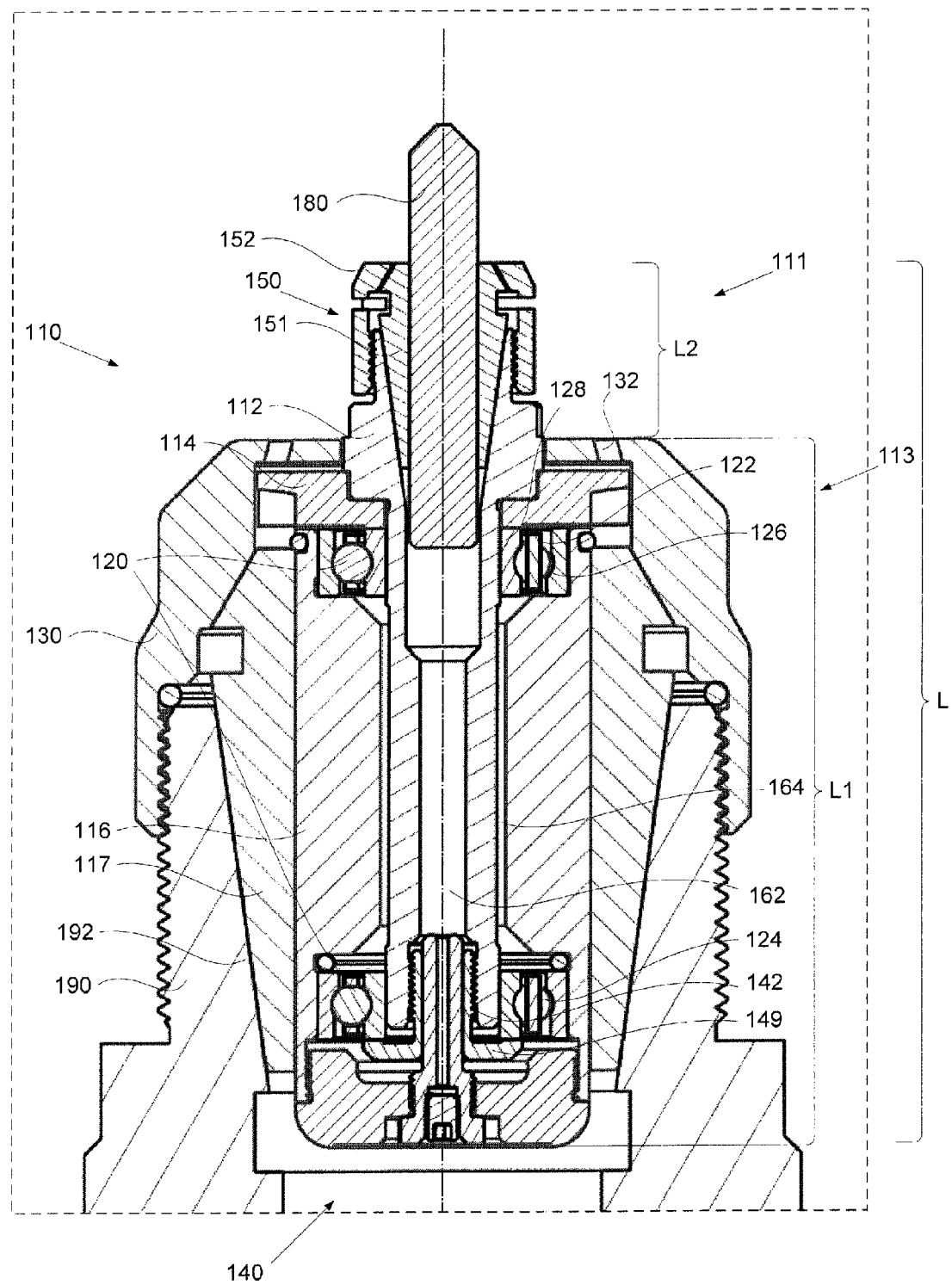
FIG. 1C is an enlarged view of the schematic cross section illustration of the exemplary spindle system of FIG. 1A, according to embodiments of the present invention.

Reference is made to FIGS. 1B and 1C depicting a schematic cross section illustration of the spindle system 100 along section plane I-I marked on FIG. 1A, according to embodiments of the present invention. FIG. 1C is an enlarged view of the part of spindle system 100 confined within dashed frame "a". According to embodiments of the present invention, spindle 110 may include, inter alia, a rotating shaft 112, a turbine 114, a bearing assembly 120, a hollow support structure 116, a front clamping nut 130, a rear assembly 140, and a tool clamping system 150.

Shaft 112 may be operatively connected with turbine 114, such that rotation of turbine 114 may rotate rotating shaft 112. For example, turbine 114 may be mounted on shaft 112 or alternatively, turbine 114 and rotating shaft 112 may be made in one piece. Turbine 114 may be an impulse turbine and may be located, for example, at a front end of shaft 112, between front end bearing 122 and front clamping nut 130.

Bearing assembly 120 may be configured to radially and axially support rotating shaft 112 within support structure 116 and tool holder 190 and to enable high-speed rotation of shaft 112 within support structure 116 and tool holder 190. Bearing assembly may include at least two bearings. For example, bearing assembly 120 may include a front end bearing 122 and a rear end bearing 124. While in the embodiment of the present invention presented in FIGS. 1A-1C bearing assembly 120 includes angular contact ball bearing, embodiments of the present invention are not limited to this type of bearing. Front end bearing 122 and a rear end bearing 124 may be installed in back-to-back (BTB) configuration, as presented in FIG. 1C, or alternatively, in either face to face (FTF) or tandem configurations, as is known in the art. The specific type of installation of front end bearing 122 and rear end bearing 124 with respect to each other may be selected to meet specific design requirements.

Front end bearing 122 and rear end bearing 124 may be preloaded with pressure by using constant pressure technique, for example, O-ring 125 as a spring that applies consistent pressure to front end bearing 122 and rear end bearing 124 against preload screw 149. Other types of springs, such as coil springs, Belleville springs, wave springs, and finger springs may be used for preloading front end bearing 122 and rear end bearing 124.

The spindle assembly may be divided to a first part 111 having a longitudinal dimension denoted L1 and a second part 113 having a longitudinal dimension denoted L2, along the longitudinal dimension, denoted L, of spindle assembly 110. Spindle assembly 110 is designed so that when spindle assembly 110 is mounted on tool holder 190, first part 111 of spindle assembly 110 is disposed or situated in a space defined by the taper socket 192 of the tool holder 190 and front clamping nut 130. According to embodiments of the present invention, first part 113 of spindle assembly 110 includes at least rear end bearing 124. Hence, at least rear end bearing 124 may be disposed in the cone shaped cavity being the space defined by the inner surface of taper socket 192 of tool holder 190 and the front clamping nut 130, when spindle assembly 110 is mounted on tool holder 190.

Support structure 116 may include a housing 117 having a plurality of passages (not shown) configured to allow high pressure coolant fluid flowing from tool holder 190 to drive turbine 114. For example, housing 117 may have longitudinal slots at its outer perimeter, extending from the rearmost part of housing 117 to the front most part of housing 117, where the coolant fluid may flow towards the blades of turbine 114. For example, a standard collet may be used for housing 117. Embodiments of the present invention are not limited to a specific slots or tunnels number and configuration. Any passages design that may enable high pressure coolant to reach turbine 114 with a sufficient pressure and appropriate angle to rotate turbine 114 at sufficient speed may be utilized. For example, the slots may be vertical, i.e. perpendicular base 148 or may be disposed with an angle with relation to base 140. After driving the turbine, passages may be provided to allow coolant exhaust. For example, openings 132 may be provided at front clamping nut 130 to allow the coolant to flow away from spindle 110. Alternatively, jets or sprinklers may be provided to direct coolant towards a working point 185 of tool 180, thus cooling and removing debris from working point 185.

Shaft 112 may include a hollow section 162 providing a passage configured to allow high pressure coolant fluid flowing from tool holder 190 to reach a central passage (not shown) that may be disposed along the center of tool 180. Rear assembly 140 may include a dynamic sealing system 142 intended to prevent, with a high but not ultimate efficiency, leakage of coolant fluid flowing through hollow section 162. Dynamic sealing system 142 may, however, allow leakage of coolant fluid through dynamic sealing system 142. Coolant fluid that does leak through dynamic sealing system 142 may flow to rear end bearing 124 and through tunnel 164 to front end bearing 122, providing lubrication and cooling to rear end bearing 124 and front end bearing 122. Thus coolant fluid may lubricate rear end bearing 124 and front end bearing 122.

Figure 1D:
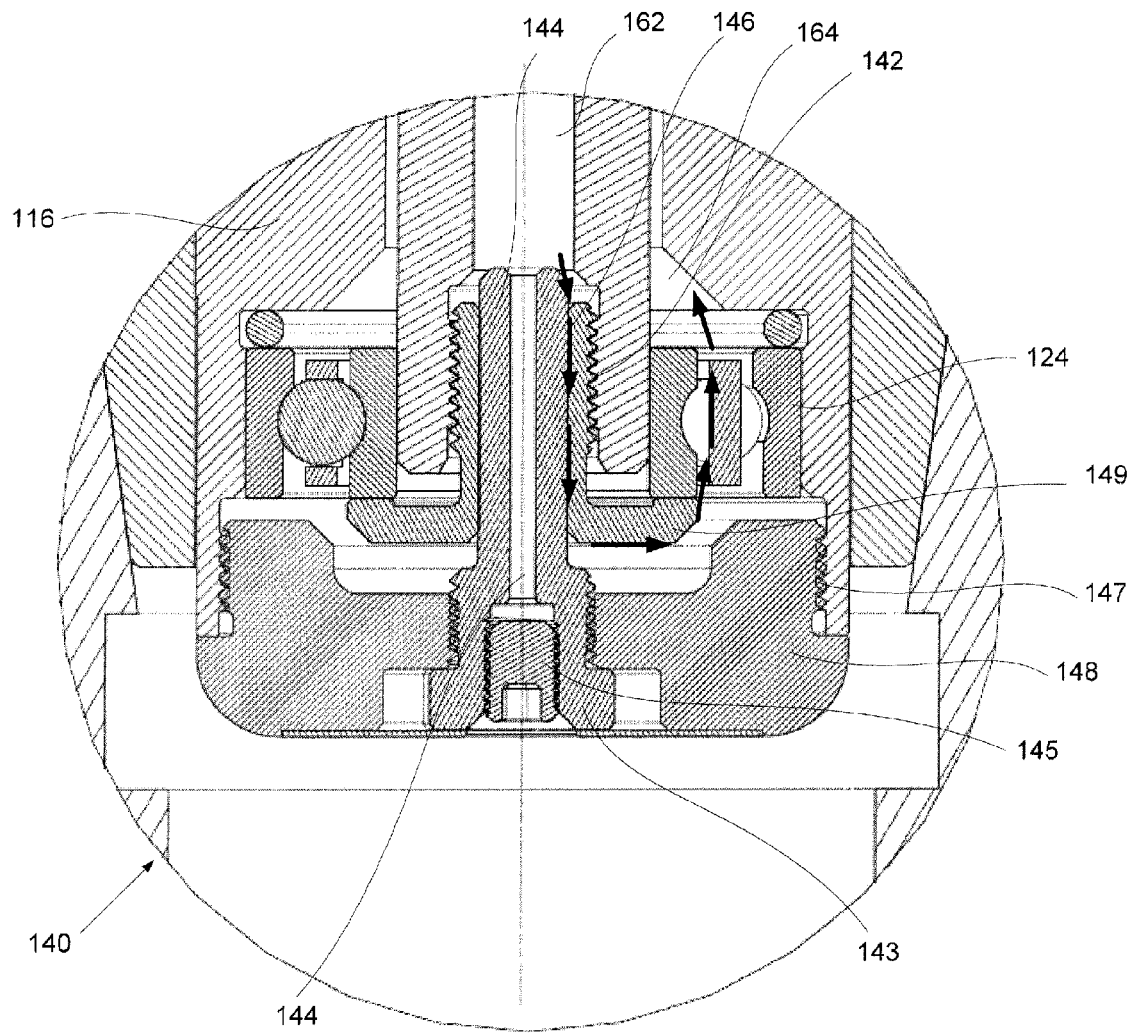
FIG. 1D is an enlarged view of the bottom part of the schematic cross section illustration of FIG. 1C, according to embodiments of the present invention.

Reference is now made to FIG. 1D depicting an enlarged view of the bottom part of the part of spindle system 100, confined within dashed frame "b" of FIG. 1B. Rear assembly 140 may include a base 148. Base 148 may be static (i.e. not rotating) with respect to shaft 112 and secured to support structure 116 by, for example, screwing threads 147. Additionally or alternatively, base 148 may be secured to support structure 116 by any other suitable method such as gluing, welding and the like. A hollow pin 143 may be located in a center passage of base 148 and secured to base 148 by any suitable method such as by screwing, gluing or the like. Hollow pin 143 may have a shank 144 protruding into the hollow section 162 of shaft 112. Hollow pin 143 may be sealed by seal 145. When not sealed, hollow pin 143 may provide passage for the high pressure coolant flowing from tool holder 190 towards tool 180. A dynamic sealing system 142, one exemplary flowing course of which is demonstrated in FIG. 1D by a series of arrows 146, may be provided along the interface of static hollow 143 (relative to support structure 116) and rotating preload screw 149. Static hollow pin 143 may be coated with a material characterized by low static friction coefficient, such as Teflon. Dynamic sealing system 142 may have high resistance to flow of the high pressure coolant and thus prevent most of the high pressure coolant from leaking from hollow section 162 and prevent pressure loss. The resistance of dynamic sealing system 142 to the flow of the coolant fluid may be set to allow leakage through dynamic sealing system 142 that may flow to rear bearing 124 and through tunnel 164 to front end bearing 122, in the amount desired to lubricate and cool the bearings.

Returning now to FIG. 1C, spindle 110 may include a tool clamping system 150. Tool clamping system 150 may include a clamping collet 151 and a tool clamping nut 152. It should be noted that embodiments of the present invention are not limited to specific tool clamping arrangement and method and that any other suitable tool clamping arrangements and techniques, such as shrink, hydraulic or shape memory allow unit, may be used.

Figure 2A:
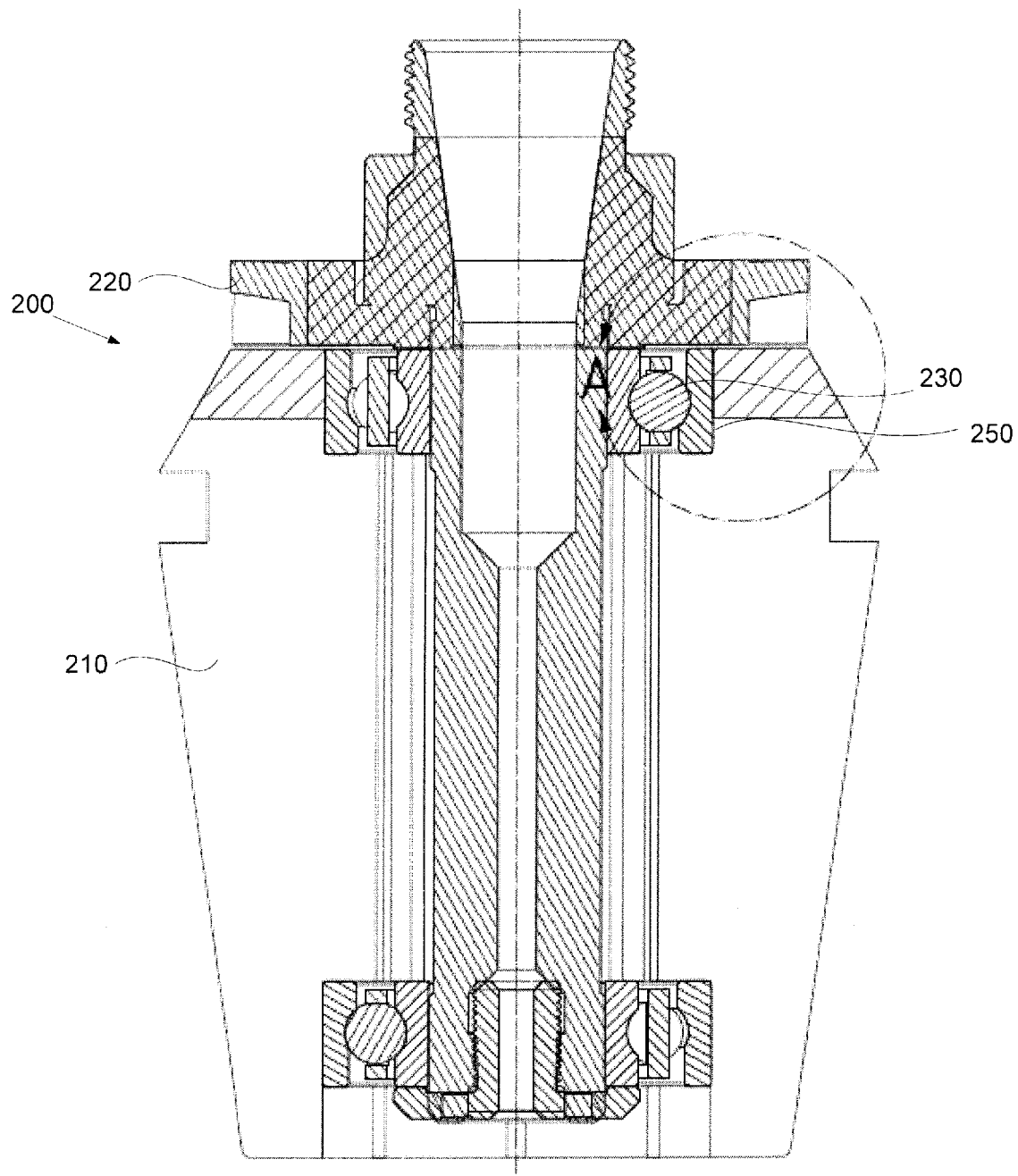
FIG. 2A is a schematic cross section illustration of an exemplary spindle assembly having a standard collet, according to embodiments of the present invention.
Figure 2B:
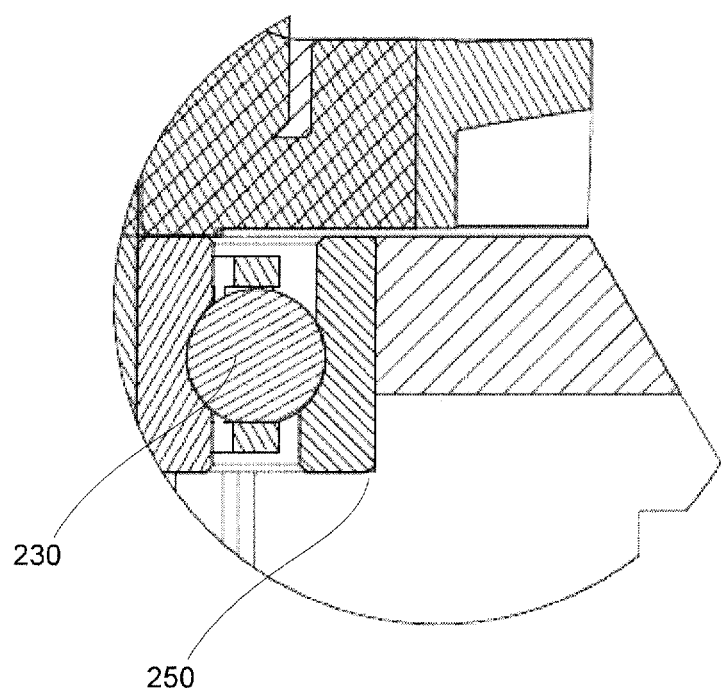
FIG. 2B is an enlarged view of the schematic cross section illustration of the exemplary spindle assembly of FIG. 2A, according to embodiments of the present invention.

Reference is made to FIGS. 2A and 2B depicting a schematic cross section illustration of an exemplary spindle assembly 200 having a standard collet 210, according to embodiments of the present invention. FIG. 2B is an enlarged view of the part of spindle assembly 200 confined within dashed frame A. Spindle assembly 200 may be generally similar to spindle assembly 110. The support structure of spindle 200 may be implemented using a standard Collet 210. Collet 210 may be machined at its front end 250 so that its internal diameter is adjusted to accommodate front end bearing 230.

Figure 2C:
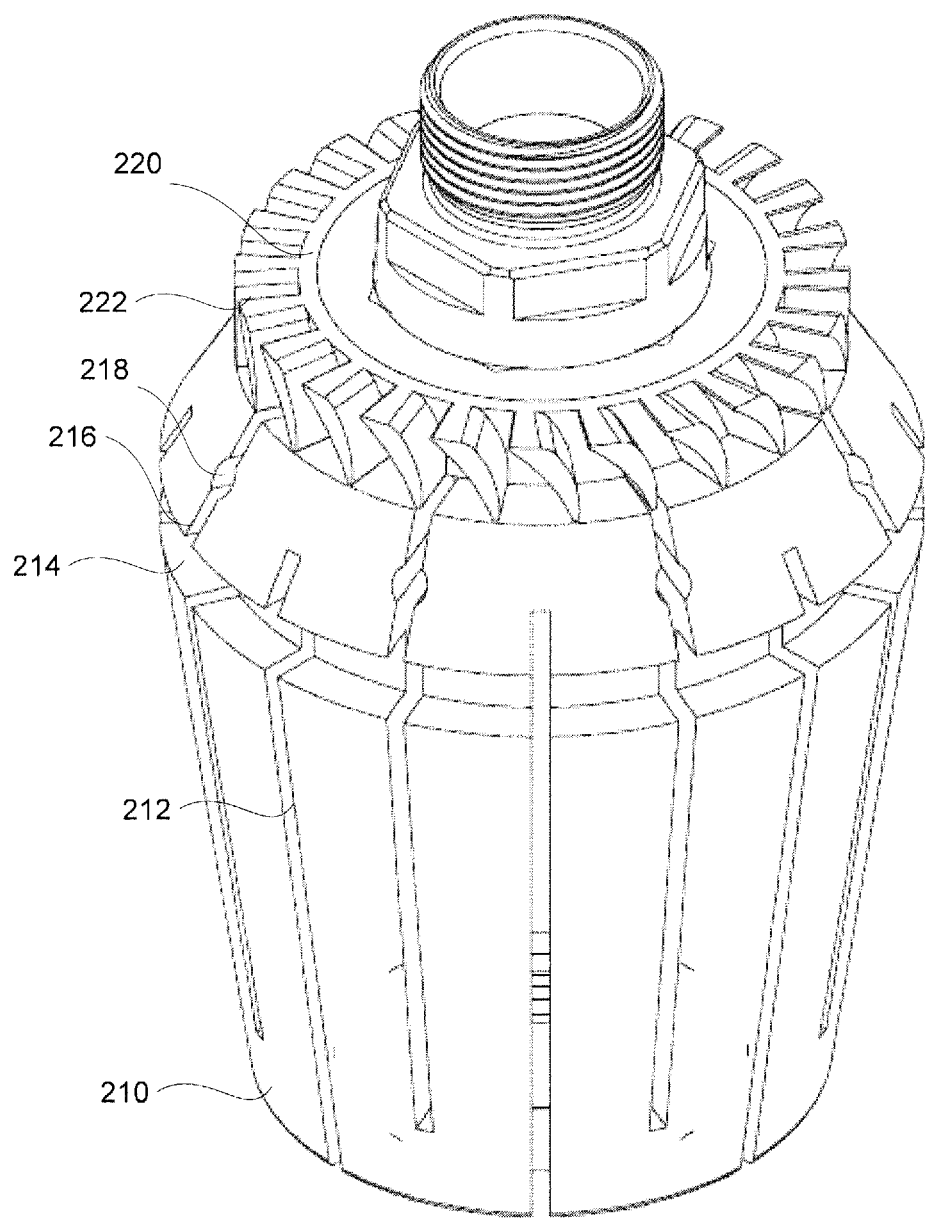
FIG. 2C is an 3D illustration of the exemplary spindle assembly of FIG. 2A, according to embodiments of the present invention.

Reference is made to FIG. 2C depicting a 3D illustration of exemplary spindle assembly 200 according to embodiments of the present invention. Collet 210 may have a plurality of longitudinal bottom slots 212 extending from the rear end of Collet at least to peripheral tunnel 214, and a plurality of longitudinal top slots 216 extending at least from peripheral tunnel 214 to the front end of Collet 210. When assembled into tool holder 190 (seen in FIGS. 1A-1B), bottom slots 212, peripheral tunnel 214, and top slots 216 may define, together with the inner surface of taper socket 192 of tool holder 190 and the inner surface of front clamping nut 130 (seen in FIG. 1B)—both forming an outer 'envelope', passages for high pressure coolant fluid. During operation, high pressure coolant provided by tool holder 190, may flow through bottom slots 212 into peripheral tunnel 214 and through top slots 216 to hit blades 222 of impulse turbine 220. Top slots 216 may include holes 218 that may be sealed by gaskets (not shown), as may be needed. Sealing some of the holes may provide some control on the pressure of the coolant flowing to turbine 220 which is rotatable with respect to collet 210, and thus on the speed of rotation and moment of turbine 220.

Figure 3A:
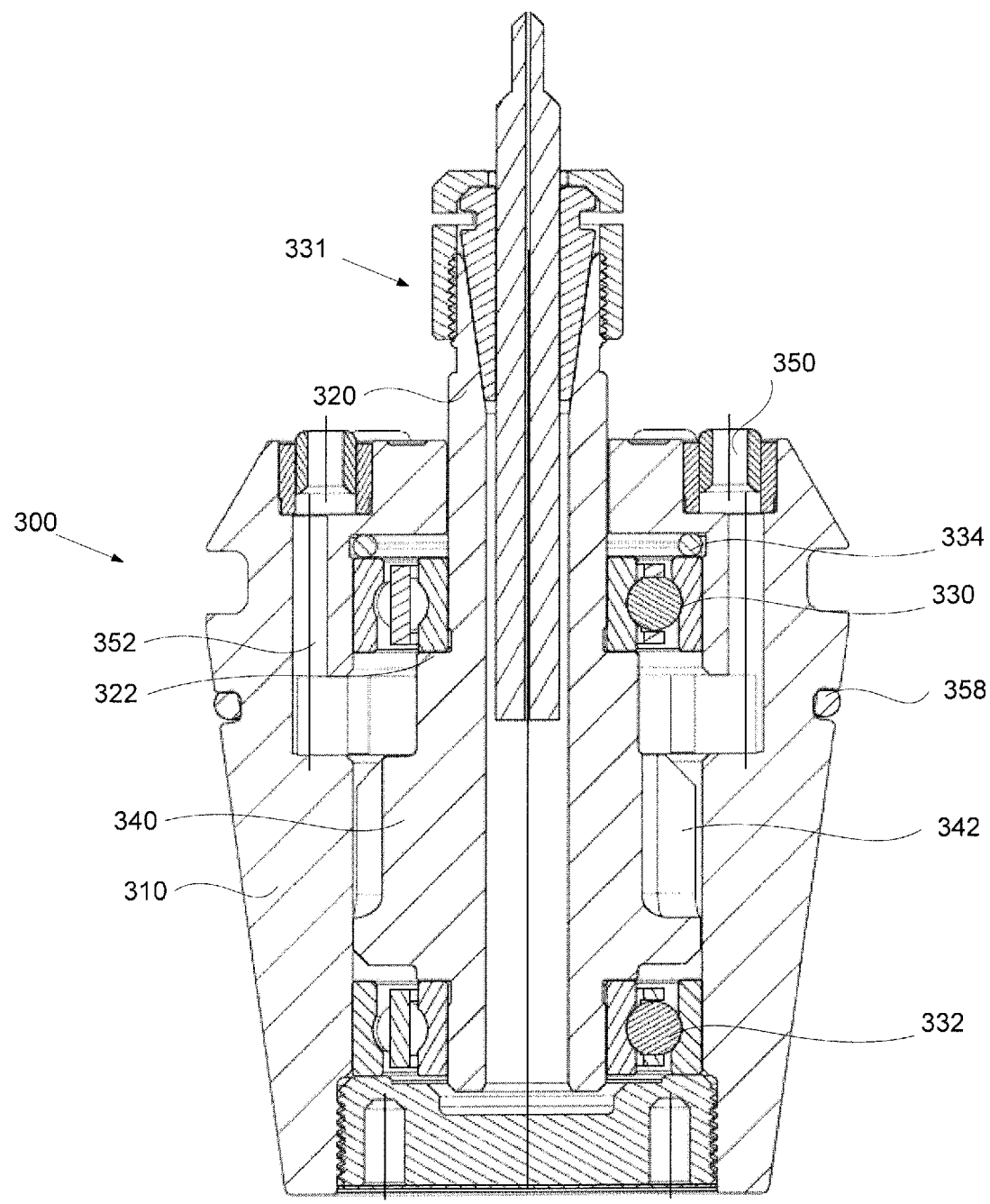
FIG. 3A is a schematic cross section illustration of an exemplary middle-turbine spindle assembly, according to embodiments of the present invention.
Figure 3B:
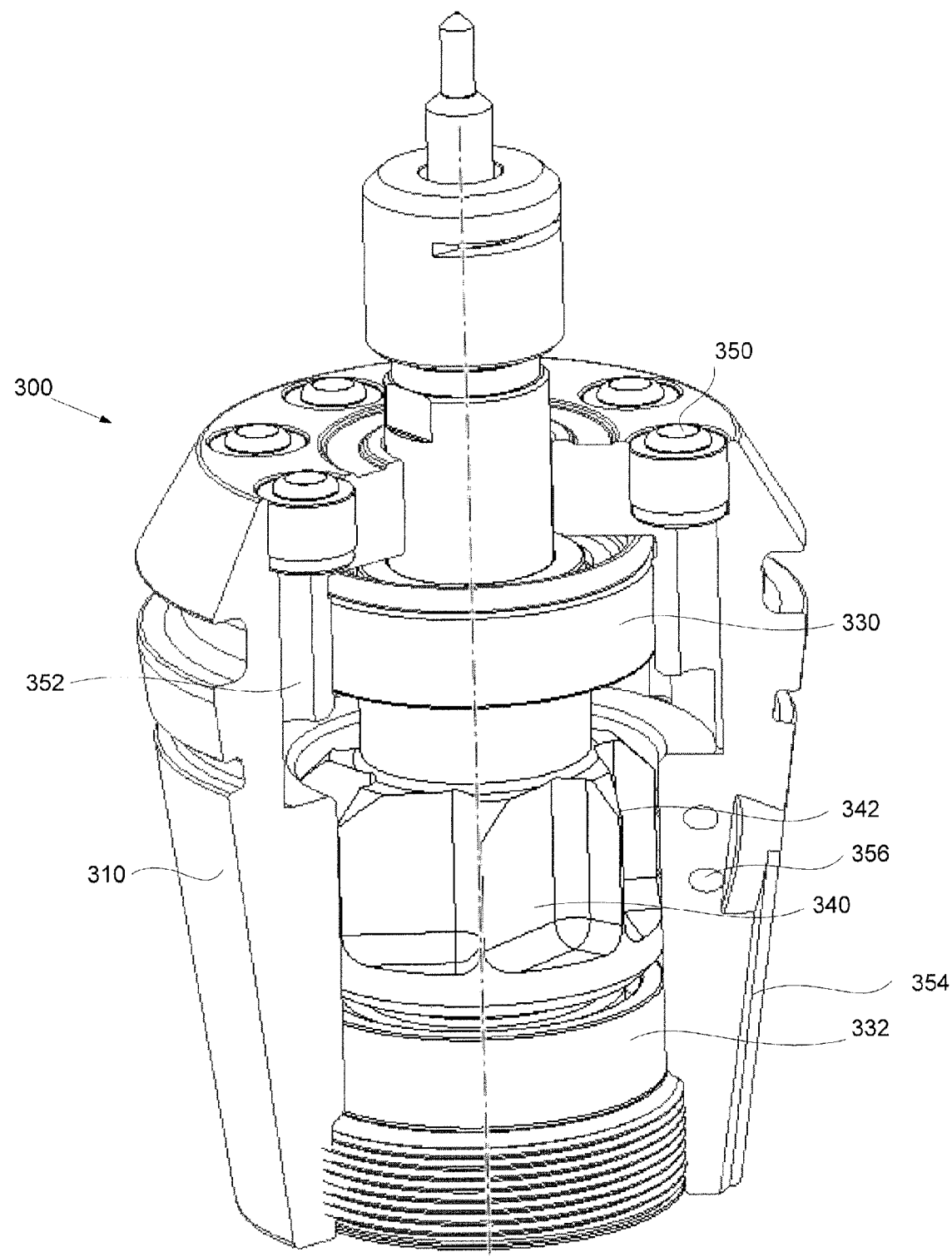
FIG. 3B is a schematic partial isometric cross section illustration of the exemplary spindle assembly of FIG. 3A, according to embodiments of the present invention.

Reference is made to FIG. 3A depicting a schematic cross section illustration, and to FIG. 3B depicting a schematic partial isometric cross section illustration of an exemplary middle-turbine spindle assembly 300, according to embodiments of the present invention. A radial impulse turbine 340 may be located at a center part of shaft 320, between front end bearing 330 and rear end bearing 332. The length of blades 342 of radial turbine 340 is increased with relation to front end turbines 114 and 220 (seen in FIGS. 1C and 2A, respectively). Increasing the length of blades 342 may increase the blades surface, which may increase the efficiency of radial turbine 340 and spindle assembly 300 with relation to spindle assemblies 110 and 200 having in which the turbine is located at the front end, between the front end bearing and clamping system 331. Locating radial turbine 340 at a center part of shaft 320 may enable reduction of the distance between front end bearing 330 and the working point of the tool with relation to a front end turbine configuration. This may desirably decrease the reaction moments on front end bearing 330. Locating radial turbine 340 at a center part of shaft 320 may require FTF configuration of front end bearing 330 and rear end bearing 332. Preloading may be achieved by O-ring 334 pressing against area 322 of shaft 320. Turbine 340 may be an integral part of shaft 320.

Slots 354 found at the bottom outer surface of housing 310 may define, together with the inner surface of taper socket 192 of tool holder 190 (seen in FIG. 1B), passages for high coolant fluid. During operation, high pressure coolant may flow from tool holder 190, through slots 354 into tunnels 356 to hit blades 342 of radial turbine 340 from a radial direction. O-ring 358 may provide sealing necessary for preventing high pressure coolant from leaking out of spindle assembly 300, between housing 310 and the inner surface of taper socket 192 of tool holder 190.

After hitting blades 342 of radial turbine 340, the coolant may flow through tunnels 352 defined in housing 310 and out of spindle assembly 300 through jets 350. Jets 350 may be adjusted to control the angle of coolant flow such that coolant may be directed toward the working point of the tool assembled on spindle assembly 300.

Figure 4A:
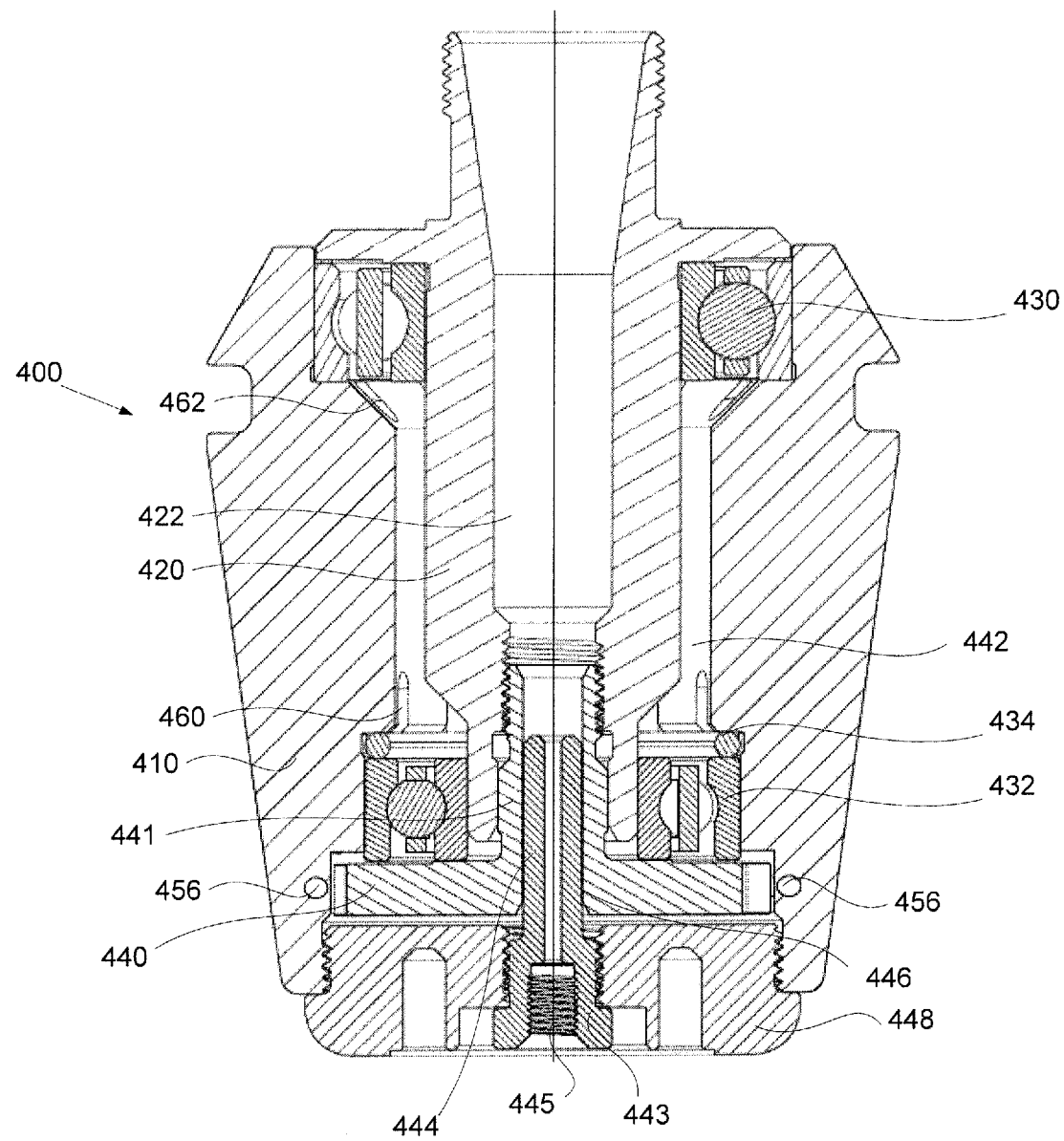
FIG. 4A is a schematic cross section illustration of an exemplary rear-turbine spindle assembly, according to embodiments of the present invention.
Figure 4B:
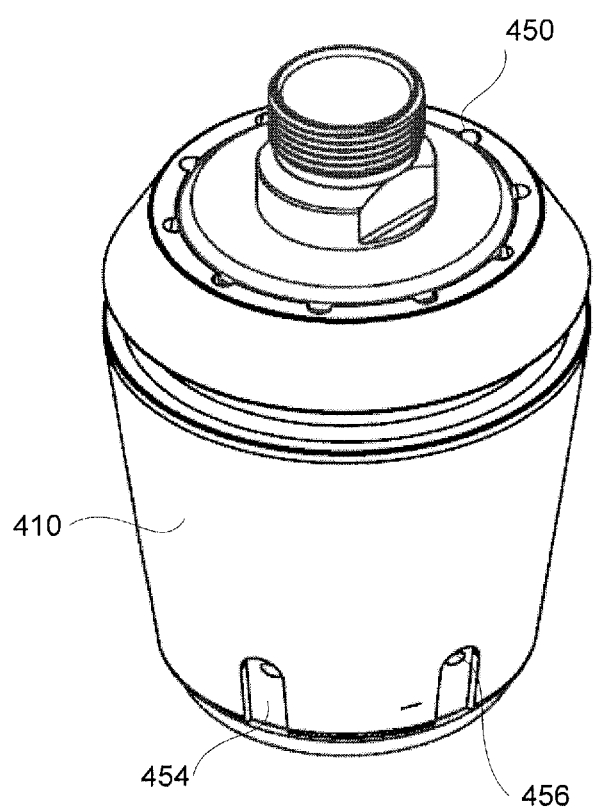
FIG. 4B is a schematic illustration of the exemplary spindle assembly of FIG. 4A, according to embodiments of the present invention.

Reference is made to FIG. 4A depicting a schematic cross section illustration and to FIG. 4B depicting a schematic illustration of an exemplary rear-turbine spindle assembly 400, according to embodiments of the present invention. A radial impulse turbine 440 may be located at a rear part of shaft 420, between base 448 and rear end bearing 432. Turbine 440 may be secured to shaft 420, for example by screwing, gluing or both.

Slots 454 found at the bottom outer surface of housing 410 may define, together with the inner surface of taper socket 192 of tool holder 190 (seen in FIG. 1B), passages for high coolant fluid. During operation, high pressure coolant may flow from tool holder 190, through slots 454 into tunnels 456 to hit the blades (not shown) of radial turbine 440 from a radial direction. After hitting the blades of radial turbine 340, the coolant may flow to rear end bearing 432 and through tunnels 460 defined in housing 410 to front end bearing 430, thus providing lubrication and cooling to rear end bearing 432 and front end bearing 430. The coolant may be ventilated through tunnels 462 defined in housing 410 and ending at openings 450.

Front end bearing 430 of spindle assembly 400 may be larger than rear end bearing 432 of spindle assembly 400. Increasing the size of front end bearing 430 may increase the loads front end bearing 430 may bear, and thus, the overall loads spindle assembly 400 may bear may be increased with relation to embodiments having a smaller front end bearing 430. However, since preloading pressure is typically related to bearing size, care should be taken when designing preload level. For example, each bearing may have a range of allowed preload levels, thus, a preload level that falls within the allowed preload levels of both rear end bearing 432 and front end bearing 430 may be selected. Rear end bearing 432 and front end bearing 430 are placed in BTB configuration and preload is performed using O-ring 434 which presses rear end bearing 432 against turbine 440.

Spindle assembly 400 may include a dynamic sealing system 446 intended to prevent, with a high efficiency, leakage of coolant fluid flowing through hollow section 422 of shaft 420. Coolant fluid that does leak through dynamic sealing system 446 may flow to turbine 440, but may not rotate turbine 440. Dynamic sealing system 446 may be defined between the outer surface of shank 444 of the static hollow pin 443 and the inner surface of shank 441 of the rotating turbine 440.

Figure 5:
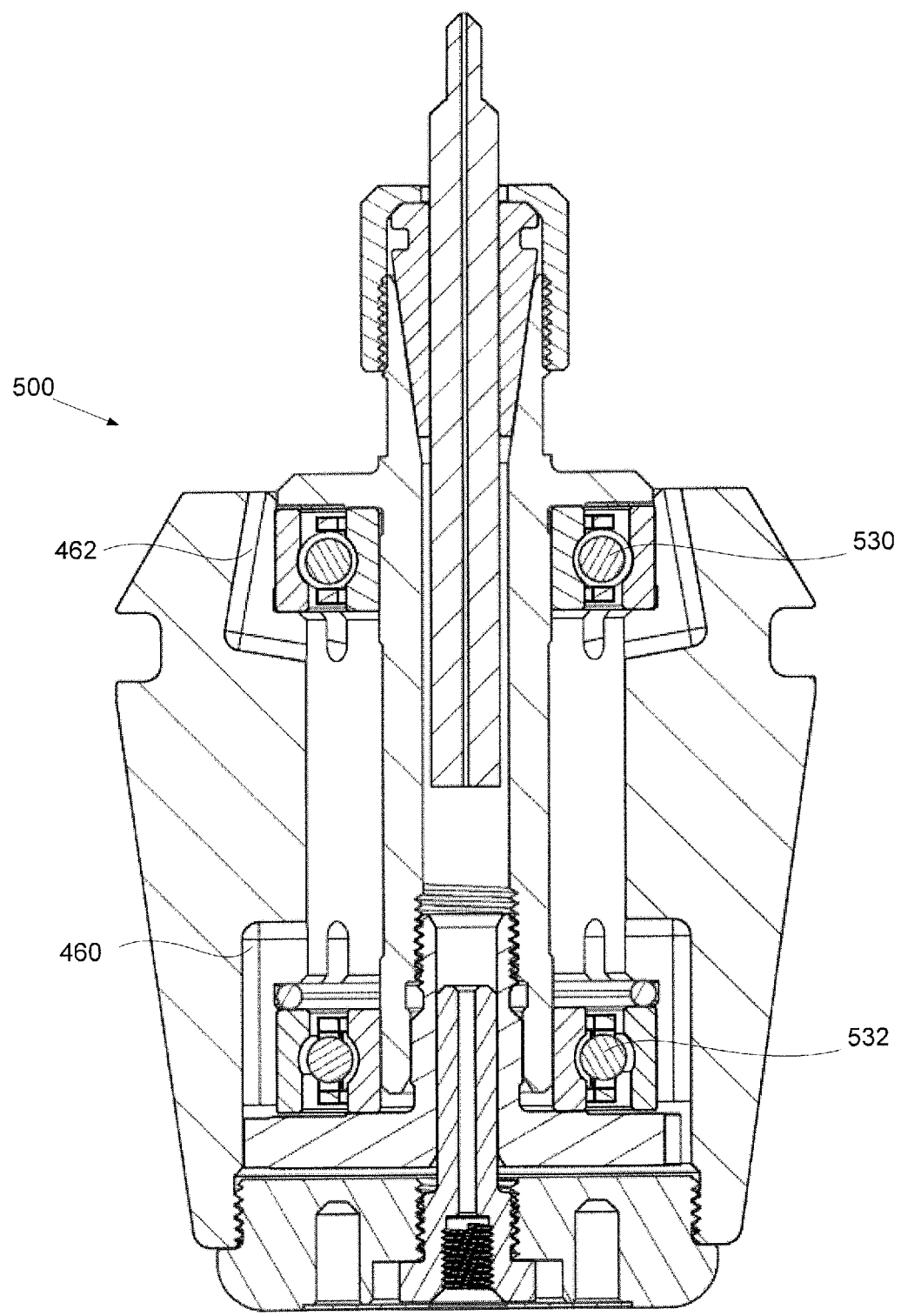
FIG. 5 is a schematic cross section illustration of another exemplary rear-turbine spindle assembly, according to embodiments of the present invention.

Reference is made to FIG. 5 depicting a schematic cross section illustration of another exemplary rear-turbine spindle assembly 500, according to embodiments of the present invention. Spindle assembly 500 is very similar to spindle assembly 400 only to rear end bearing 432 and front end bearing 430 have substantially the same size. FIG. 5 gives a different view on tunnels 460 and 462.

Figure 6A:
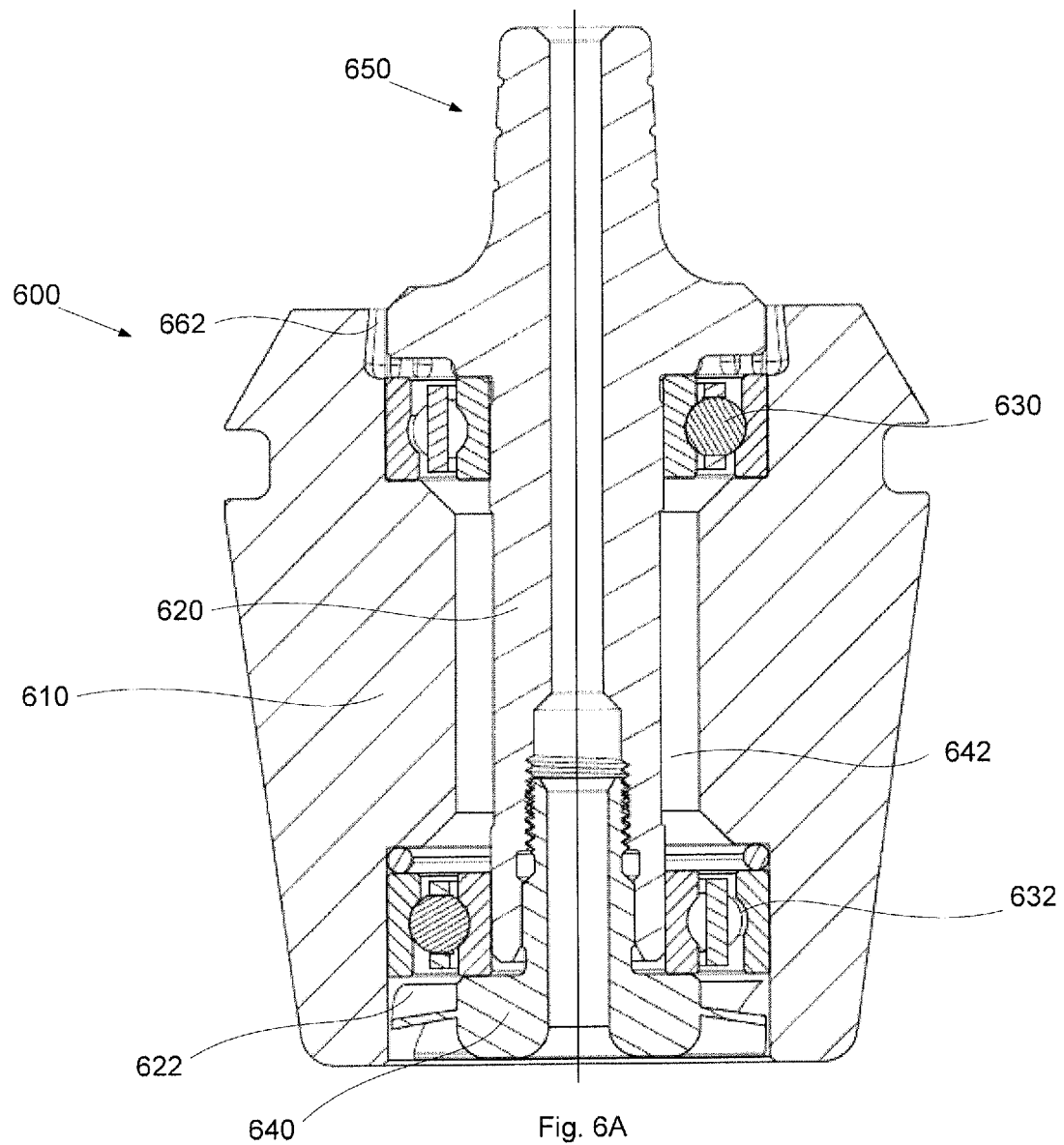
FIG. 6A is a schematic cross section illustration of an exemplary spindle assembly having a rear-reaction-turbine 640, according to embodiments of the present invention.
Figure 6B:
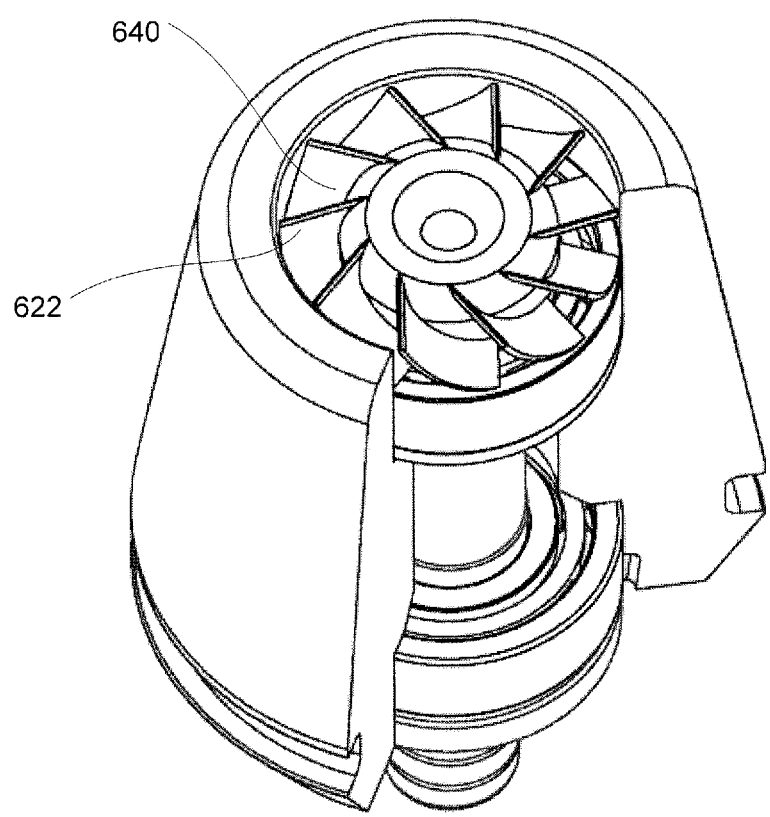
FIG. 6B is a schematic partial isometric cross section illustration of the exemplary spindle assembly of FIG. 6A, according to embodiments of the present invention.

Reference is made to FIG. 6A depicting a schematic cross section illustration and to FIG. 6B depicting a schematic partial isometric cross section illustration of an exemplary spindle assembly 600 having a rear-reaction-turbine 640, according to embodiments of the present invention. FIG. 6B is presented rear side up. A reaction turbine 640 may be located at a rear part of shaft 620, behind rear end bearing 632. Turbine 640 may be secured to shaft 620, for example by screwing, gluing or both. High pressure coolant may flow directly from tool holder 190 (shown in FIG. 1) onto blades 622 of turbine 640. Reaction turbine 640 may be a propeller type turbine, characterized by relatively high moments but low speed with relation to impulse turbines. Spindle assembly 600 may include heat shrink tool clamping system 650. Tool replacement requires heating of the front part of shaft 620. Heat shrink tool clamping systems are considered accurate relatively to Collet clamping.

After hitting the blades of reaction turbine 640, the coolant may flow through rear end bearing 632 through tunnels 642 defined in housing 610 and front end bearing 630, thus providing lubrication and cooling to rear end bearing 632 and front end bearing 630. The coolant may be exhausted through openings 662 defined in housing 610. Openings 662 may be tilted at a sharp angle with relation to rotation axis R, thus coolant may flow in the general direction of an assumed working point.

Figure 7A:
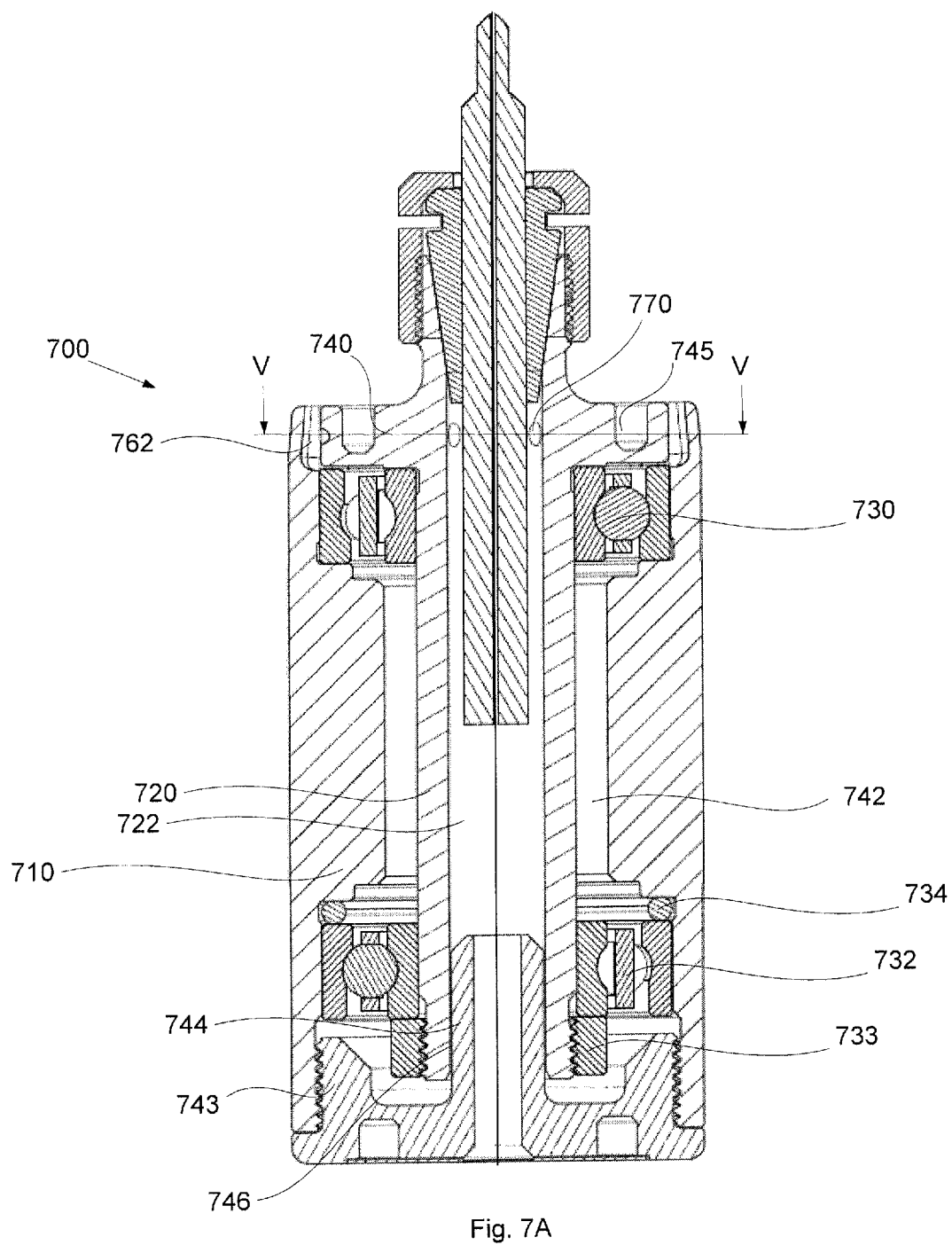
FIG. 7A is a longitudinal schematic cross section illustration of an exemplary spindle assembly having a front-reaction-turbine, according to embodiments of the present invention.
Figure 7B:
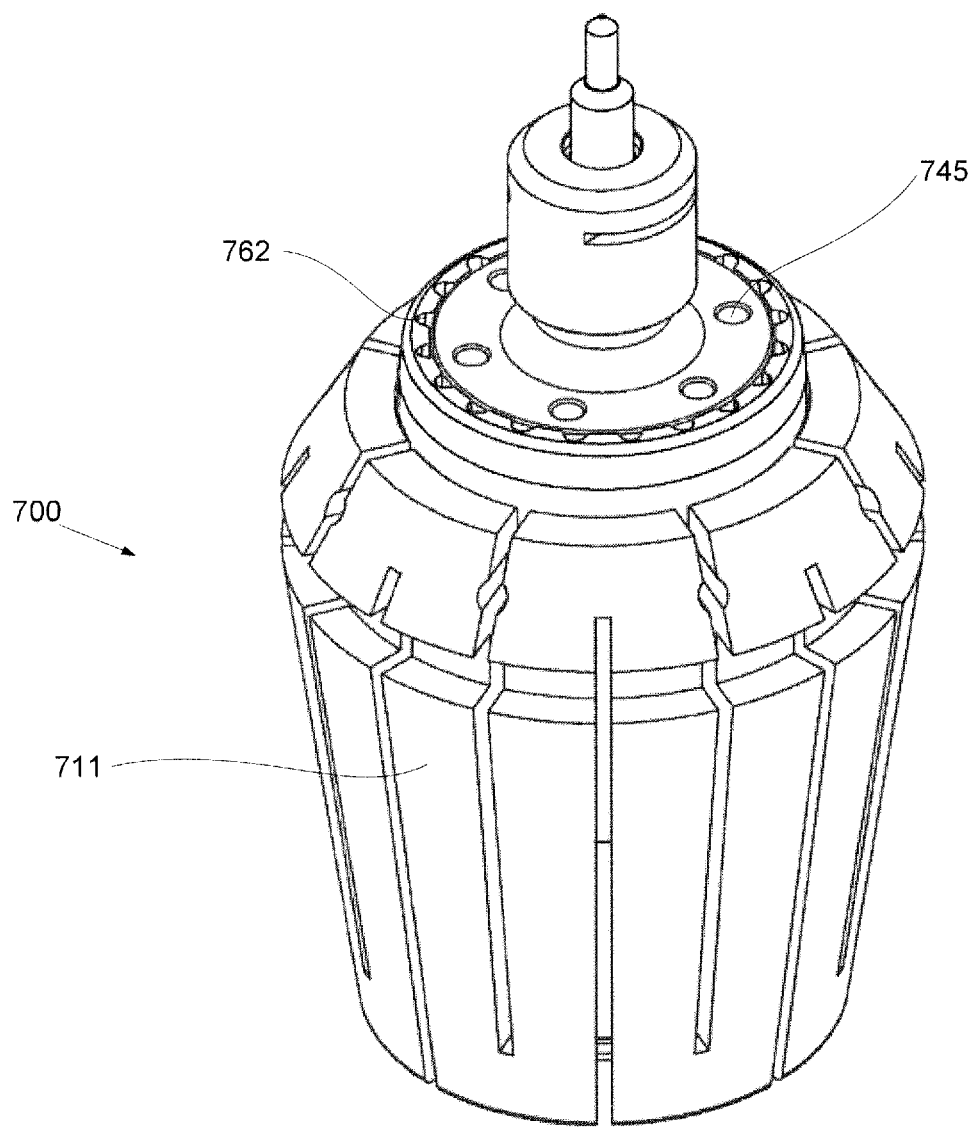
FIG. 7B is a schematic 3D illustration of the exemplary spindle assembly of FIG. 7A, according to embodiments of the present invention.
Figure 7C:
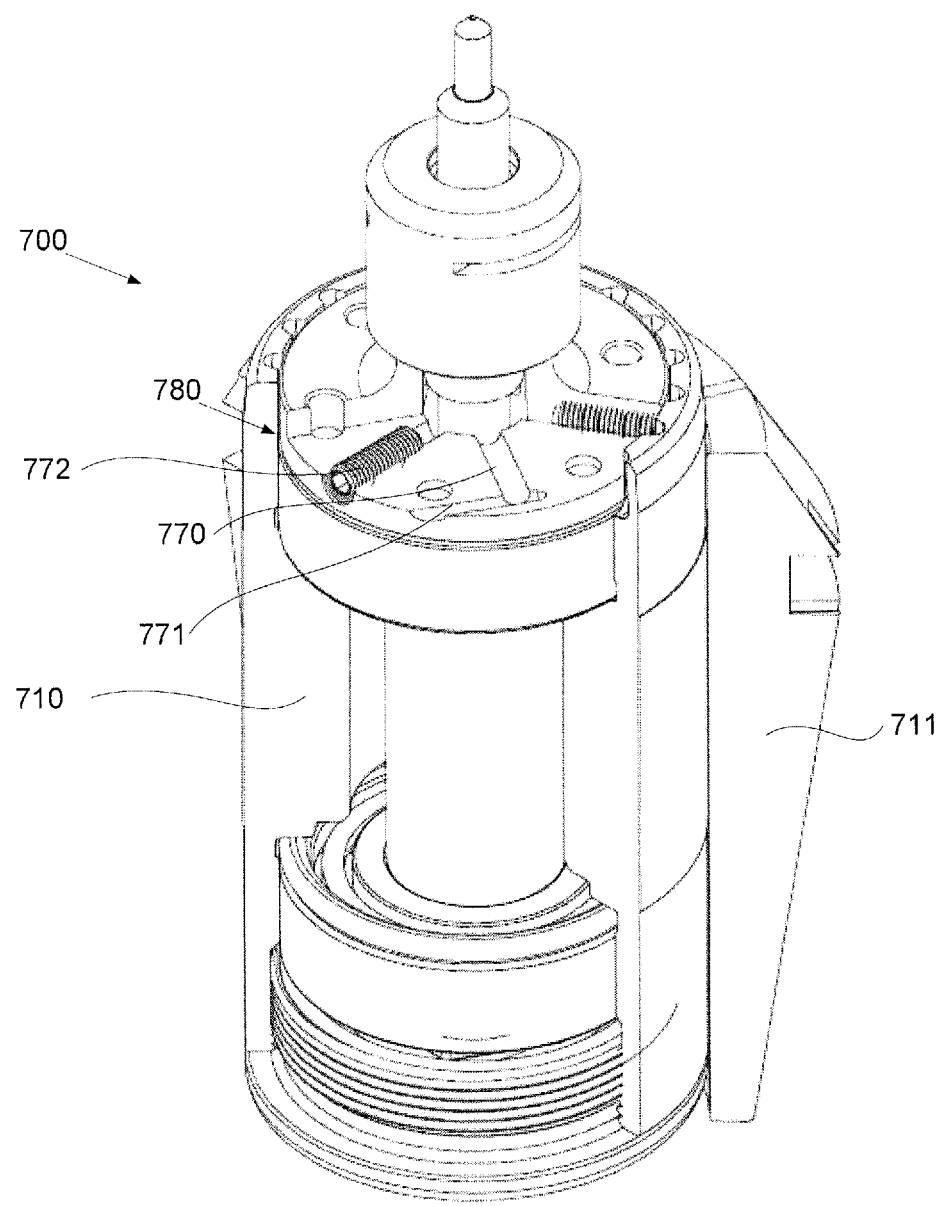
FIG. 7C is a schematic partial cross section illustration of the exemplary spindle assembly of FIG. 7A, according to embodiments of the present invention.
Figure 7D:
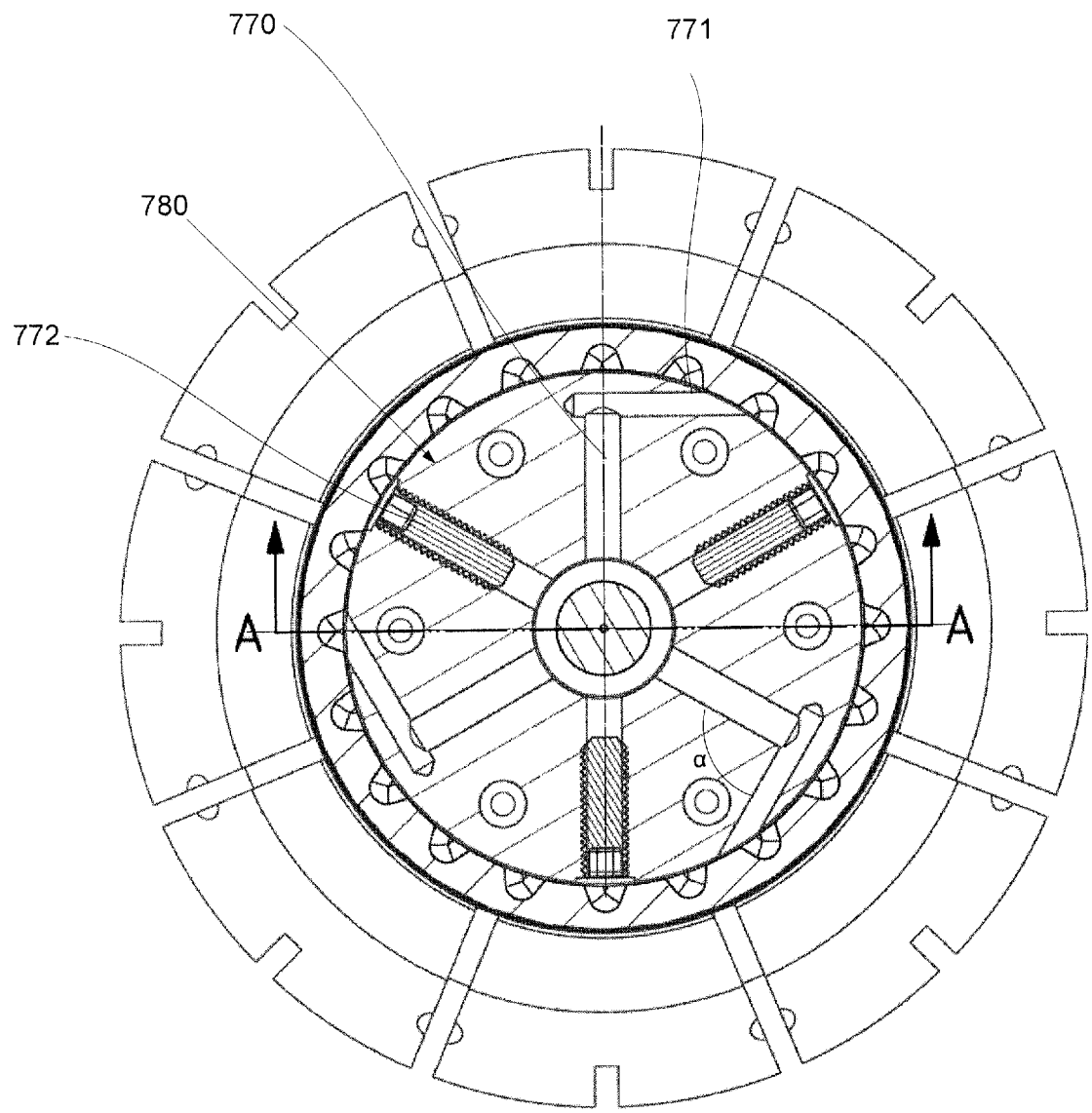
FIG. 7D is a transversal schematic cross section illustration of the exemplary spindle assembly of FIG. 7A, according to embodiments of the present invention.

Reference is made to FIG. 7A depicting a longitudinal schematic cross section illustration, to FIG. 7B depicting a schematic 3D illustration, to FIG. 7C depicting schematic partial cross section illustration, and to FIG. 7D depicting a transversal cross section illustration, respectively, of an exemplary spindle assembly 700 having a rear-reaction-turbine 740, according to embodiments of the present invention. FIG. 7D depicts a cross section illustration of spindle assembly 700 along section line V-V presented on FIG. 7A.

Spindle assembly 700 may include a reaction turbine 740 implemented as a tunnel system 780 including central tunnels 770 and peripheral tunnels 771. Peripheral tunnels 771 may be disposed with a strait or obtuse angle a (alpha) During operation, high pressure coolant may flow from tool holder 190 (shown in FIG. 1A) through hollow section 722 of shaft 720 and to tunnel system 770 thus creating a thrust that may rotate turbine 740. Central tunnels 770 may be drilled the whole way from the opposite direction crossing the center and reaching peripheral tunnels 771, and may be sealed with gaskets 772. Alternatively central tunnels 770 may he drilled from the perimeter into the center with the part of central tunnels 771 that is between the perimeter and peripheral tunnels 771 sealed. For example, turbine 740 may include three pairs of central tunnels 770 and peripheral tunnels 771 disposed at an angle of about 120 degrees from one another.

Spindle assembly 700 may include a dynamic sealing system 746 intended to prevent, with a high efficiency, leakage of coolant fluid flowing through hollow section 722 of shaft 720. Coolant fluid that does leak through dynamic sealing system 746 may flow to rear end bearing 732, passage 742 and front end bearing 730. Dynamic sealing system 746 may be defined between the outer surface of shank 744 of the static hollow base 743 and the inner surface of rotating shaft 720. Coolant may be exhausted through openings 762.

Rear end bearing 732 and front end bearing 730 are placed in BTB configuration and preload may be performed using O-ring 734 which presses rear end bearing 732 against nut 733, which is secured to shaft 720. A support structure may be provided by collet 711 and additional support 710.

Figure 8A:
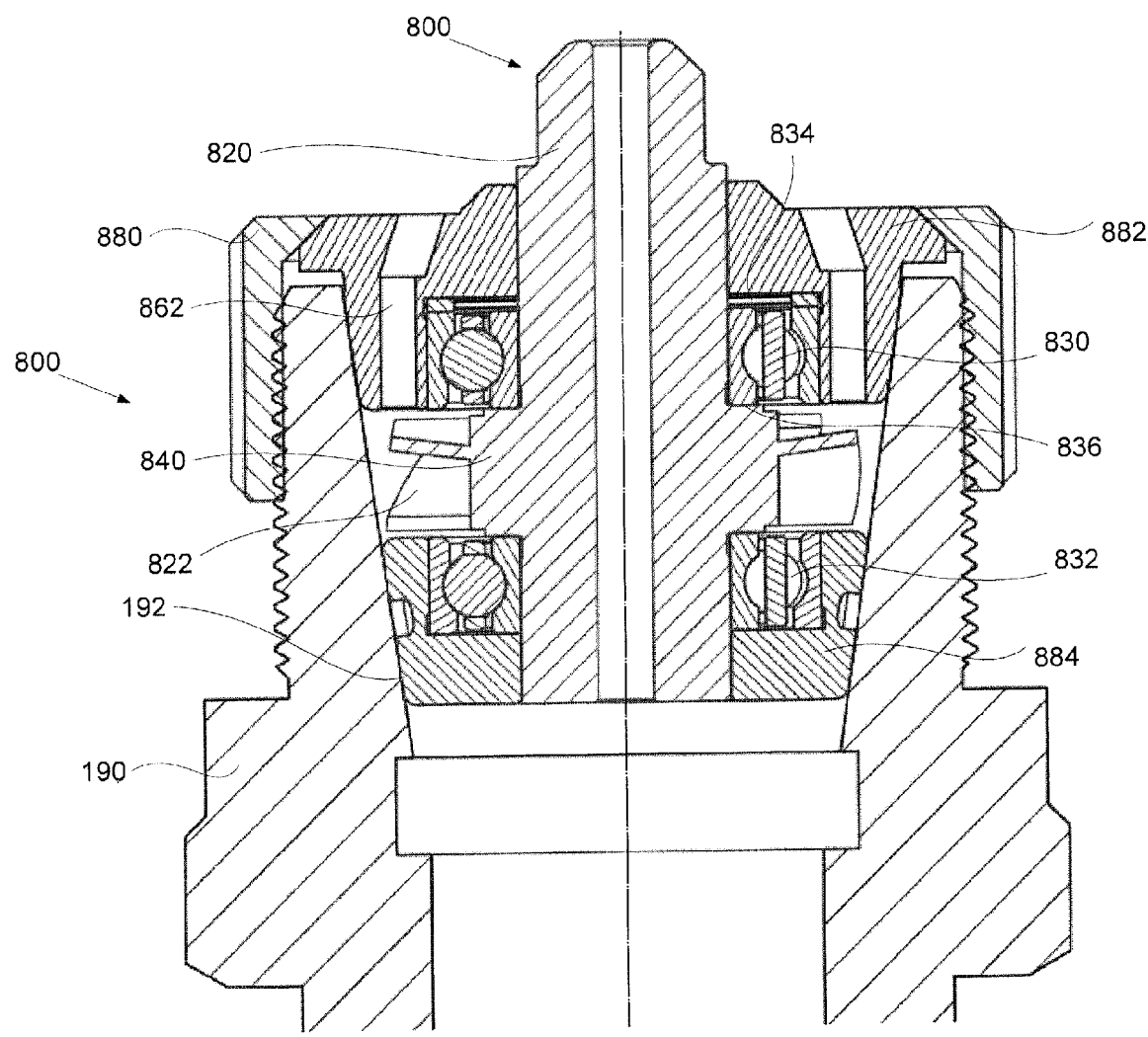
FIG. 8A is a schematic cross section illustration of an exemplary frameless spindle assembly, according to embodiments of the present invention.
Figure 8B:
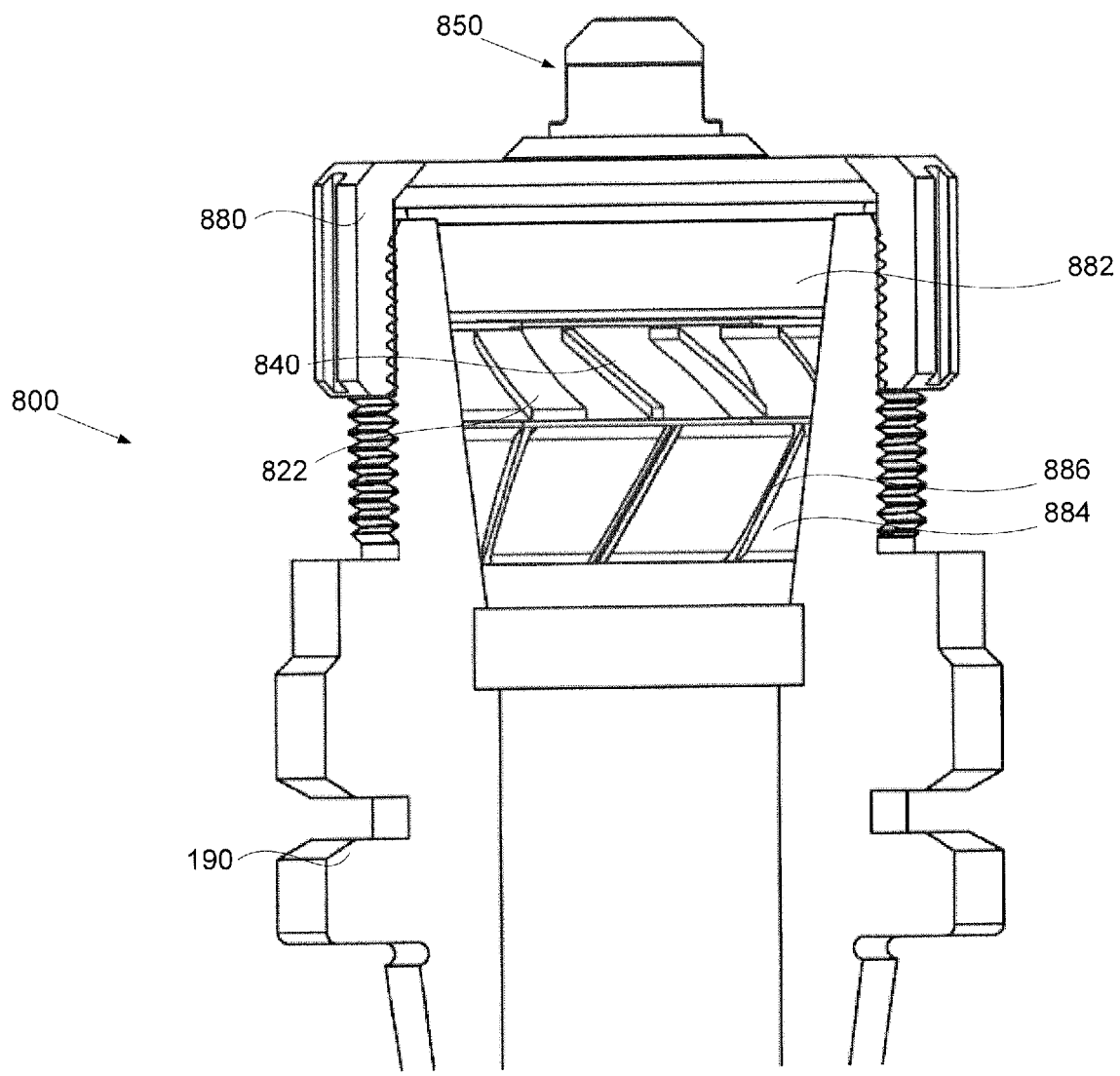
FIG. 8B is a schematic illustration of the exemplary spindle assembly of FIG. 8A, according to embodiments of the present invention.
Figure 8C:
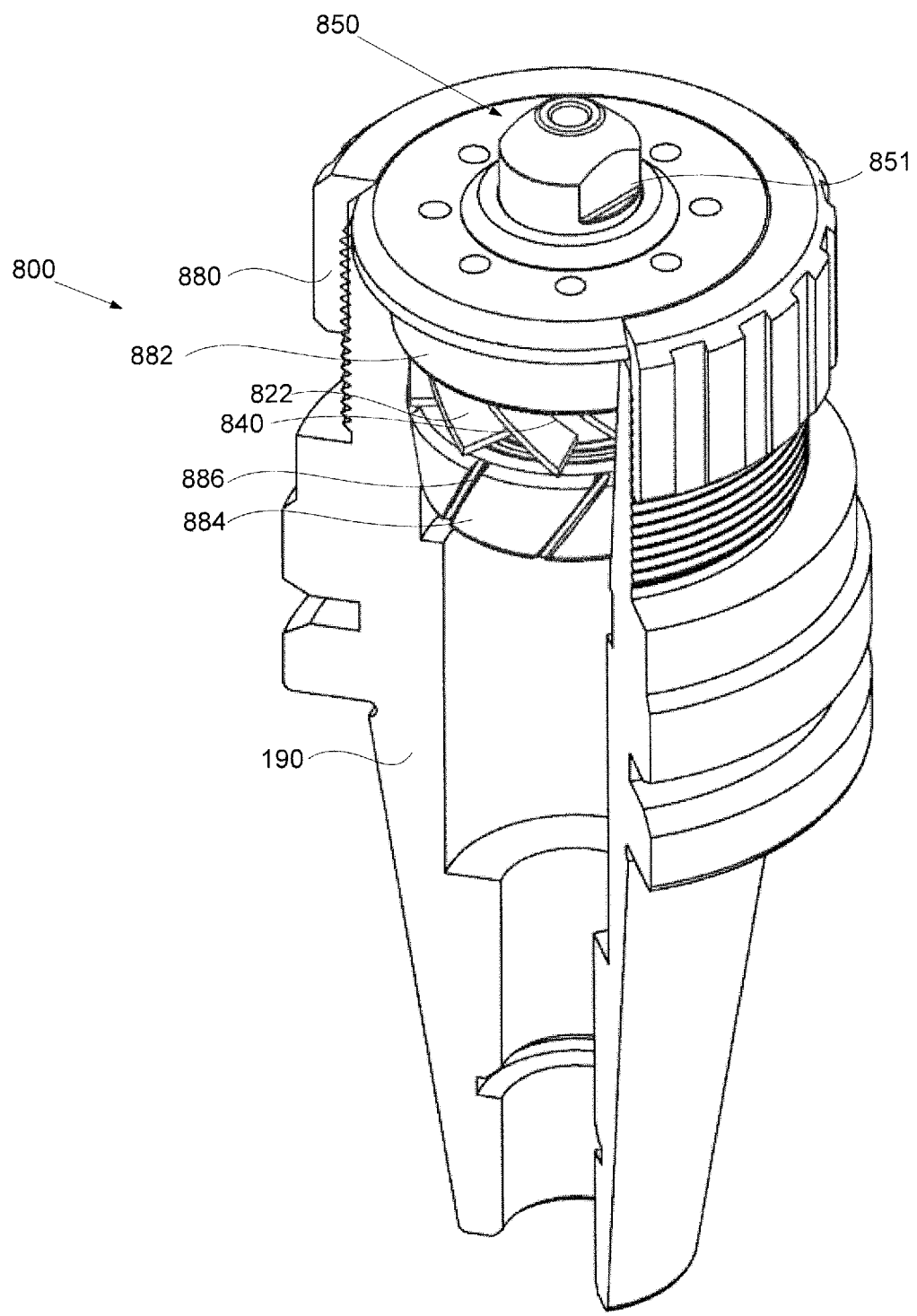
FIG. 8C is a schematic partial isometric cross section illustration of the exemplary spindle assembly of FIG. 8A, according to embodiments of the present invention.

Reference is made to FIG. 8A depicting a horizontal schematic cross section illustration, to FIG. 8B depicting a schematic partial isometric cross section illustration, and to FIG. 8C depicting a schematic illustration, of an exemplary frameless spindle assembly 800, according to embodiments of the present invention. A radial impulse turbine 840 may be located at a center part of shaft 820, between front end bearing 830 and rear end bearing 832. Radial impulse turbine 840 may be an integral part of shaft 820. Thus radial impulse turbine 840 and shaft 820 may be provided as a single piece. Front end bearing 830 may be mounted on front end support 882 and rear end bearing 832 may be mounted on rear end support 884. From an operative perspective, tool holder 190 may function as a housing holding rear end support 884, shaft 820 and front end support 882. A front clamping nut 880 may be screwed to tool holder 190 to further hold the parts of frameless spindle assembly 800 together.

According to embodiments of the present invention, at least rear end bearing 832 may be disposed in a cone shaped cavity being the space defined by the inner surface of taper socket 192 of tool holder 190 and the front clamping nut 880.

Rear end support 884 may have diagonal slots 886 at its outer perimeter. When assembled into tool holder 190, diagonal slots 886 may define, together with the inner surface of taper socket 192 of tool holder 190 passages for high pressure coolant fluid. During operation, high pressure coolant may flow from tool holder 190, through diagonal slots 886 to blades 822 of impulse turbine 840. Diagonal slots 886 may be perpendicular to blades 822 of impulse turbine 840, such that the high pressure coolant fluid may hit blades 822 of impulse turbine 840 at a about 45 degrees, thus increasing the efficiently of turbine 840 and of frameless spindle assembly 800. Front end bearing 830 and rear end bearing bearing 832 may be placed in FTF configuration and preload may be performed using spring, such as a wave spring 834, which presses front end bearing 830 against area 836 of shaft 820.

Frameless spindle assembly 800 may include elastic deformation tool clamping system 650. When round hollow section 822 of shaft 820 is drilled during the manufacture phase of shaft 820, front part of shaft 820 may be clamped at, for example, two points by a retention system. When clamping is released, hollow section 822 gets an ellipsoid cross section. Tool replacement requires clamping of the front part of shaft 820 by a retention system and inserting the tool. When the clamping is released, the tool may be held at two contact points located at the short axes of the ellipsoid.

Figure 9A:
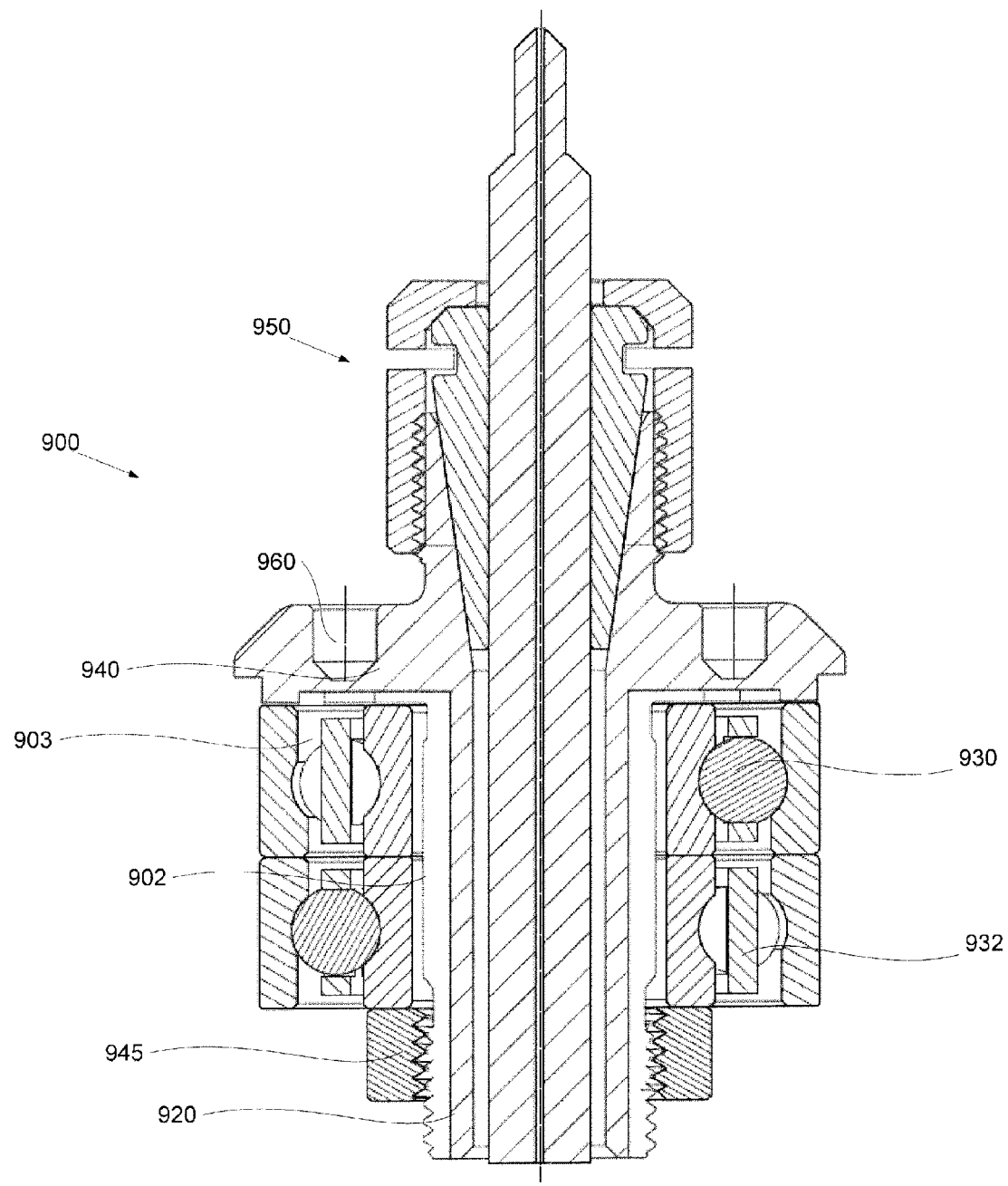
FIG. 9A is a horizontal schematic cross section illustration of an exemplary rotor based spindle assembly, according to embodiments of the present invention.

Reference is made to FIG. 9A depicting a cross section illustration, of an exemplary rotor based spindle assembly 900, according to embodiments of the present invention. Spindle assembly 900 may be assembled of standard, off-the-shelf parts such as: Ball bearings, O-Rings, Preload nut, ER collet (as spindle housing), tool holder (also part of the spindle housing) and tool clamping system (collet and nut), except for shaft 920. Reaction turbine 940 may be located, for example, at a front end of shaft 920, between front end bearing 930 and tool clamping system 950. Reaction turbine 940 may be an integral part of shaft 920. Thus reaction turbine 940 and shaft 920 may be provided as a single piece. Front end bearing 930 and rear end bearing 932 may be placed BTB, abutting each other, and may be preloaded using positioning preload technique. Front end bearing 930 and rear end bearing 932 may be held in place between turbine 940 and screw nut 945. Preparation for rotor retention may be achieved by a plurality of holes 960.

Figure 9B:
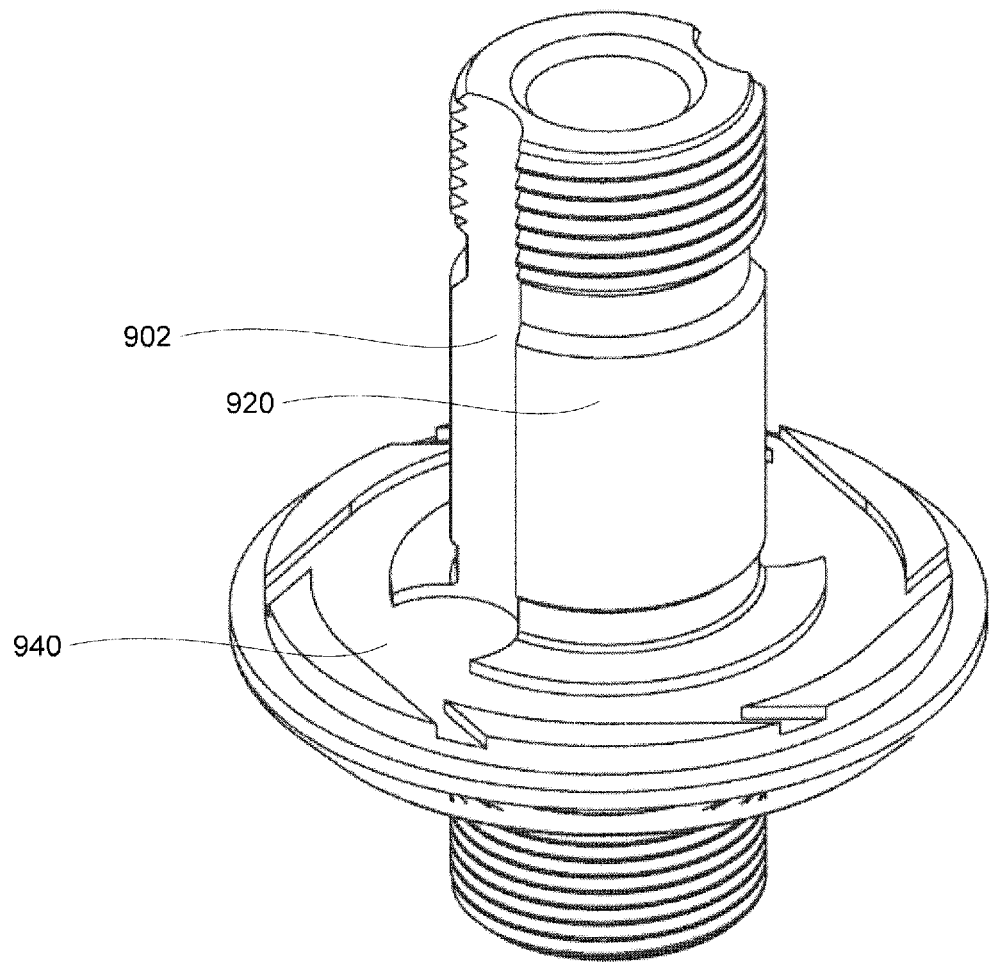
FIG. 9B is a schematic illustration of an exemplary shaft, according to embodiments of the present invention.
Figure 9C:
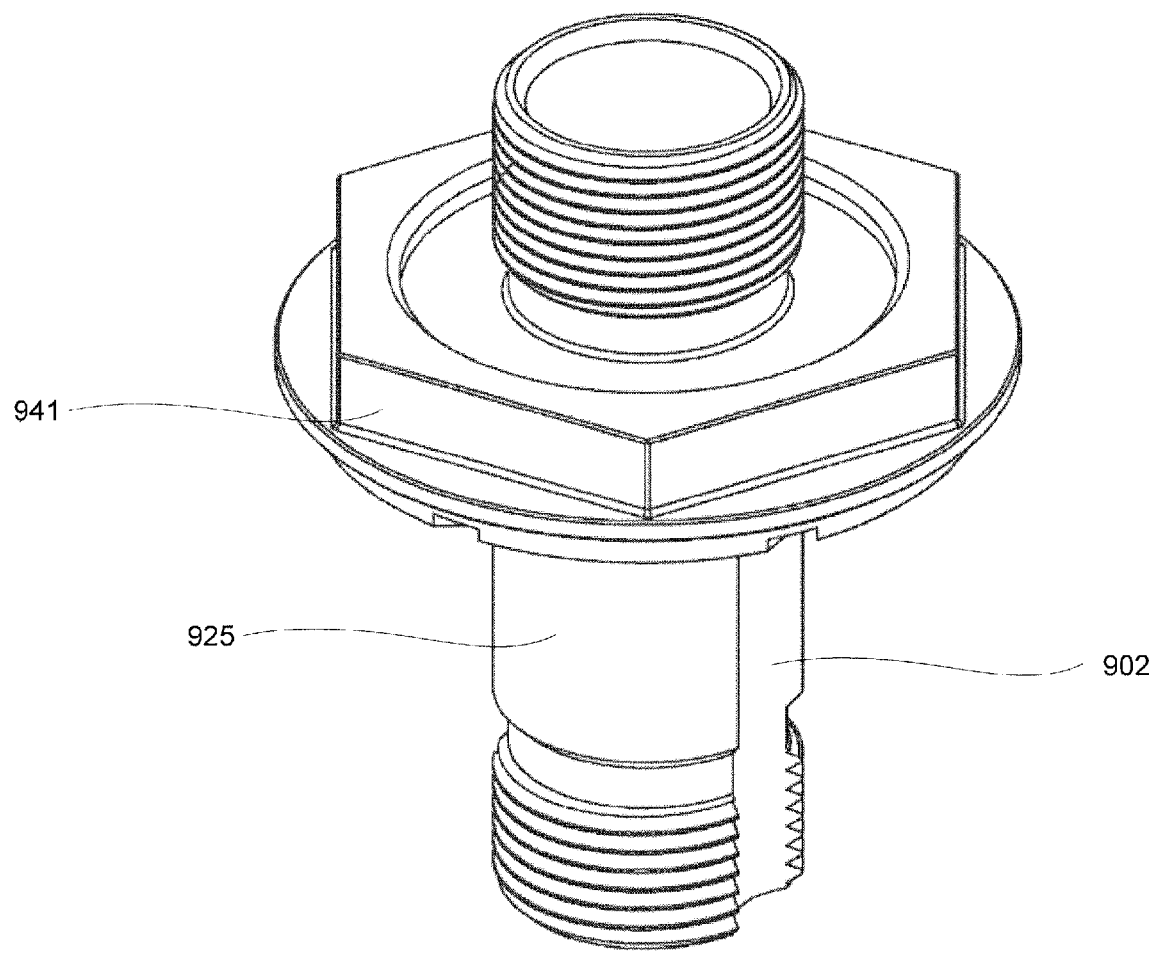
FIG. 9C is a schematic illustration of another exemplary shaft, according to embodiments of the present invention.

Reference is now made to FIG. 9B depicting a schematic illustration an exemplary shaft 920 according to embodiments of the present invention. Shaft 920 is depicted rear side up. Reaction turbine 940 is engraved into shaft 920. FIG. 9C depicts a schematic illustration of a second exemplary shaft 925 according to embodiments of the present invention. Shaft 925 is similar to shaft 920, except for the preparation made for rotor retention, which is done here by six flat areas.

Referring now to FIGS. 9A-C, high pressure coolant fluid may flow from tool holder 190 towards turbine 940 through tunnels 902 formed on the sides of shaft 920 or 92. Tunnels 902 provide passage for high pressure coolant between shaft 920 or 925 and bearings 930 and 932. Additionally high pressure coolant fluid may flow from tool holder 190 towards turbine 940 through bearings 930 and 932 the outer rail of front end bearing 930 may provide sealing to prevent high pressure coolant fluid to leak out of spindle assembly 900 before it reaches turbine 940.

Figure 9D:
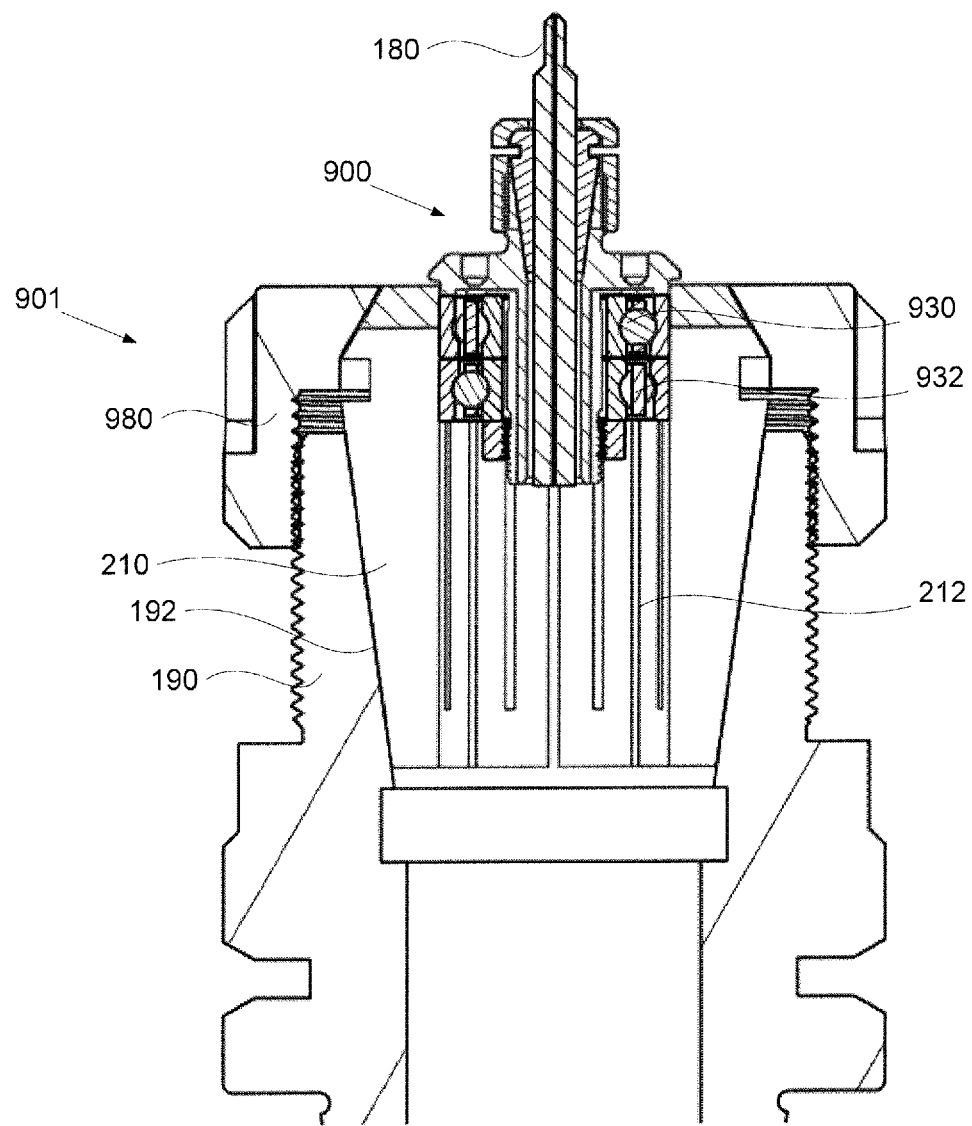
FIG. 9D is a schematic cross section illustration of the exemplary spindle assembly of FIG. 9A, according to embodiments of the present invention.

Reference is made to FIG. 9D depicting a schematic cross section illustration of the exemplary spindle system 901 along section I-I marked on FIG. 1A, according to embodiments of the present invention. According to embodiments of the present invention, spindle system 901 may include spindle assembly 900, mounted on a tool holder 190, and holding a tool 180. Spindle assembly 900 may include collet 210. Collet 210 may be a standard, off-the-shelf collet. Collet 210 may have longitudinal slots 212 at its outer perimeter. To prevent coolant splashes to undesired directions, collet 210 may be sealed.

According to embodiments of the present invention, at least rear end bearing 932 may be disposed in a cone shaped cavity being the space defined by the inner surface of taper socket 192 of tool holder 190 and the front clamping nut 980.

Figure 10:
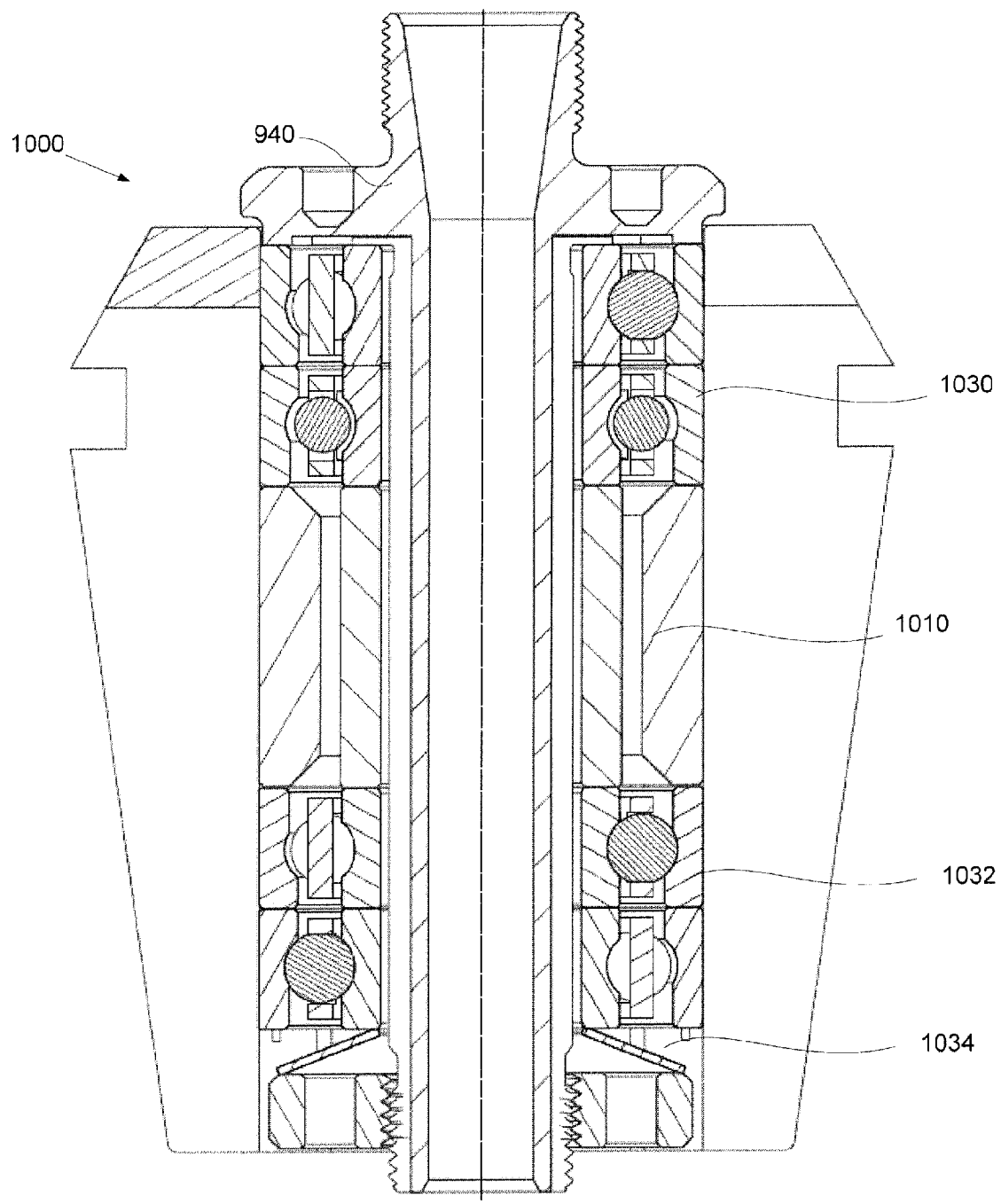
FIG. 10 is a horizontal schematic cross section illustration of an exemplary double bearing spindle assembly, according to embodiments of the present invention.

Reference is made to FIG. 10 depicting a cross section illustration, of an exemplary double bearing spindle assembly 1000, according to embodiments of the present invention. Operating principles of spindle assembly 1000 resemble these of spindle assembly 900. Spindle assembly 1000 and may include a reaction turbine 940, similar to reaction turbine 940 used in spindle assembly 900. Front end bearing 1030 and rear end bearing 1032, may each include a pair of adjacent bearings. Each pair may be assembled BTB while front end bearing 1030 and rear end bearing 1032 are assembled FTF. An outer sleeve 1010 may provide support to front end bearing 1030 and rear end bearing 1032 to prevent possible damage that may occur while assembling and disassembling the tool. Constant pressure preloading may be achieved by a spring, such as Belleville spring 1034 pressing front end bearing 1030 and rear end bearing 1032 against turbine 940.

Figure 11:
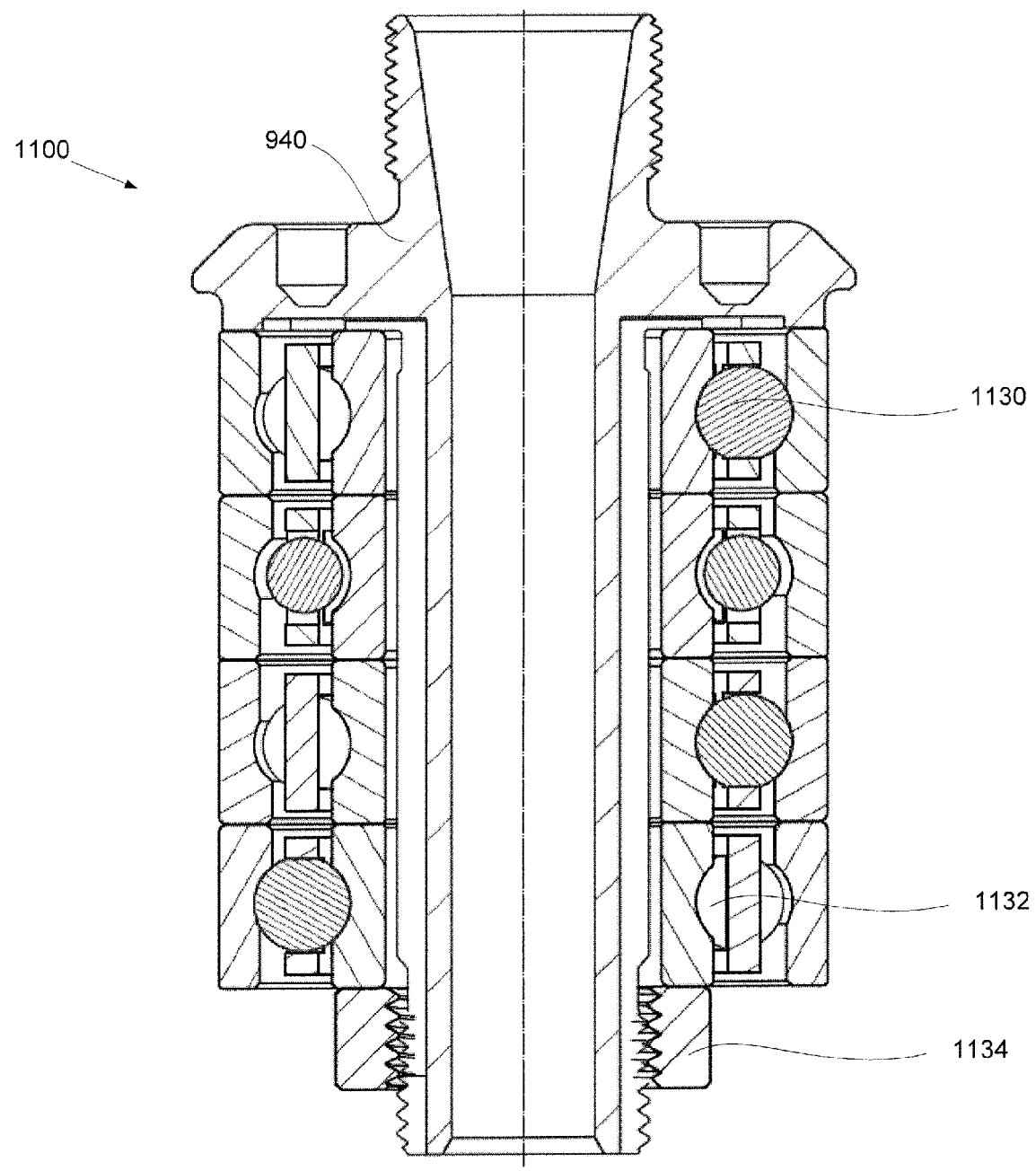
FIG. 11 is a horizontal schematic cross section illustration of another exemplary double bearing spindle assembly, according to embodiments of the present invention.

Reference is made to FIG. 11 depicting a cross section illustration, of another exemplary double bearing spindle assembly 1100, according to embodiments of the present invention. Operating principles of spindle assembly 1100 resemble these of spindle assembly 900. Spindle assembly 1100 and may include a reaction turbine 940, similar to similar to reaction turbine 940 used in spindle assembly 900. Front end bearing 1130 and rear end bearings 132, may be positioned adjacent each other and may each include a pair of adjacent bearings. Each pair may be assembled BTB while front end bearing 1030 and rear end bearing 1032 are assembled FTF. Positioning preloading may be achieved by screw-nut 1134 and turbine 940.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A spindle assembly configured to be assembled at an internal taper socket of a tool holder, the assembly having a rear end and a front end, the front end being proximal to a tool clamping system of the assembly, and the rear end being proximal to an end of the assembly opposite to the tool clamping system, the assembly comprising:
- a rotating shaft configured for rotation within the tool holder;
- a bearing assembly, comprising a front end bearing assembly and rear end bearing assembly, configured to support the rotating shaft within the tool holder and to enable rotation of the shaft within the tool holder;
- a turbine operatively connected with the rotating shaft, the turbine configured to rotate the rotating shaft;
- a hollow housing to mechanically support the components of the spindle assembly; and
- a plurality of slots formed in the outer surface of the housing and configured to form, with the inner surface of the taper socket of the tool holder, passages to allow high pressure coolant fluid, of 8-90 Bar, to flow from the tool holder to drive the turbine,
- wherein at least one bearing of the bearing assembly is disposed in a part of the spindle assembly which is configured to be situated in a space defined by the taper socket of the tool holder and a front clamping nut.

2. The spindle assembly of claim 1, wherein the hollow housing comprises a collet.

3. The spindle assembly of claim 1, comprising a hollow tunnel through the rotating shaft, the hollow tunnel configured to allow some of the coolant to flow, at high pressure of 8-90 Bar, towards a central bore of a tool mounted on the spindle assembly.

4. The spindle assembly of claim 1, wherein the front end bearing assembly and rear end bearing assembly are mounted in a configuration selected from the group consisting of: back to back, face to face and tandem bearing orientation.

5. The spindle assembly of claim 1, wherein each bearing assembly comprises at least one bearing.

6. The spindle assembly of claim 1, wherein the turbine is placed in front of the front end bearing assembly.

7. The spindle assembly of claim 1, wherein the turbine is selected from the group consisting of: an axial impulse turbine, a radial impulse turbine and a reaction turbine.

8. The spindle assembly of claim 1, wherein the coolant is emulsion of water and oil.

9. The spindle assembly of claim 1, comprising a tool clamping system.

* * * * *